US012338346B2

(12) United States Patent
Gutacker et al.

(10) Patent No.: US 12,338,346 B2
(45) Date of Patent: Jun. 24, 2025

(54) RADIATION CURABLE COMPOSITION WITH IMPROVED MECHANICAL PROPERTIES

(71) Applicant: Henkel AG & Co. KGaA, Duesseldorf (DE)

(72) Inventors: Andrea Gutacker, Langenfeld (DE); Ralf Dunekake, Duesseldorf (DE); Markus Bonigut, Hilden (DE); Sebastien Lanau, Duesseldorf (DE); Klaus Helpenstein, Moechengladbach (DE); Ligang Zhao, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 896 days.

(21) Appl. No.: 17/454,526

(22) Filed: Nov. 11, 2021

(65) Prior Publication Data
US 2022/0064442 A1 Mar. 3, 2022

Related U.S. Application Data

(63) Continuation of application No. PCT/EP2020/062862, filed on May 8, 2020.

(30) Foreign Application Priority Data

May 13, 2019 (EP) .................................... 19174106
May 13, 2019 (EP) .................................... 19174114

(51) Int. Cl.
| | | |
|---|---|---|
| *C08F 2/46* | (2006.01) | |
| *C08F 2/50* | (2006.01) | |
| *C08F 220/18* | (2006.01) | |
| *C08F 220/20* | (2006.01) | |
| *C08G 18/10* | (2006.01) | |
| *C08G 18/24* | (2006.01) | |
| *C08G 18/48* | (2006.01) | |
| *C08G 18/75* | (2006.01) | |
| *C08G 61/04* | (2006.01) | |
| *C08K 3/36* | (2006.01) | |
| *C08K 5/544* | (2006.01) | |
| *C08L 75/02* | (2006.01) | |
| *C08L 75/08* | (2006.01) | |
| *C08L 75/16* | (2006.01) | |

(52) U.S. Cl.
CPC ......... *C08L 75/16* (2013.01); *C08F 220/1811* (2020.02); *C08F 220/20* (2013.01); *C08G 18/10* (2013.01); *C08G 18/242* (2013.01); *C08G 18/4845* (2013.01); *C08G 18/755* (2013.01); *C08K 3/36* (2013.01); *C08K 5/544* (2013.01); *C08L 75/02* (2013.01); *C08L 75/08* (2013.01); *C08G 2150/00* (2013.01); *C08G 2170/00* (2013.01); *C08G 2190/00* (2013.01); *C08L 2312/06* (2013.01); *C08L 2312/08* (2013.01)

(58) Field of Classification Search
CPC ......... C09J 175/16; C09J 151/08; C08K 3/36; C08K 3/26; C08K 5/544; C08K 2003/265; C08K 9/04; C08G 18/642; C08G 18/246; C08G 18/4845; C08G 18/3893; C08G 18/10; C08G 18/755; C08G 18/242; C08G 18/4825; C08G 18/672; C08G 18/48; C08G 2170/00; C08G 2150/00; C08G 2190/00; C08L 75/16; C08L 75/02; C08L 75/08; C08L 2312/08; C08L 2312/06; C08F 290/067; C08F 220/1811; C09D 175/16; C09D 151/08; C09D 7/61; C09D 7/20; C09D 5/00
USPC ........... 522/97, 90, 1, 189, 184, 71, 6; 520/1
See application file for complete search history.

(56) References Cited

U.S. PATENT DOCUMENTS

| | | |
|---|---|---|
| 3,700,643 A | 10/1972 | Smith et al. |
| 10,308,846 B2 | 6/2019 | Zhang et al. |
| 2004/0181007 A1 | 9/2004 | Acevedo et al. |
| 2012/0329897 A1 | 12/2012 | True et al. |
| 2013/0274414 A1 | 10/2013 | Bolt et al. |
| 2014/0193652 A1* | 7/2014 | Lionberger ............. B29C 35/08 264/447 |
| 2014/0272175 A1 | 9/2014 | Curatolo |
| 2017/0009010 A1 | 1/2017 | Curatolo |
| 2017/0029653 A1* | 2/2017 | Zhao .................... C09D 133/12 |
| 2018/0094100 A1 | 4/2018 | Farmer et al. |
| 2022/0056195 A1 | 2/2022 | Lanau et al. |
| 2022/0064364 A1 | 3/2022 | Lanau et al. |

FOREIGN PATENT DOCUMENTS

| | | |
|---|---|---|
| CN | 103173137 A | 6/2013 |
| CN | 109608589 A | 4/2019 |
| EP | 1767553 A1 | 3/2007 |
| EP | 2960298 A1 | 12/2015 |

(Continued)

OTHER PUBLICATIONS

International Search Report for International PCT Patent Application No. PCT/EP2020/062831 mailed Jul. 31, 2020.

(Continued)

*Primary Examiner* — Jessica Whiteley
(74) *Attorney, Agent, or Firm* — Mary K. Cameron

(57) ABSTRACT

The present disclosure relates to a radiation or radiation/moisture dual curable compositions based on (meth)acrylate polymers or (meth)acrylate- and silane-terminated polymers. The invention further relates to their use as an adhesive, sealant and/or coating material, and adhesive, sealant and/or coating materials comprising said curable composition thereof.

28 Claims, No Drawings

(56) References Cited

FOREIGN PATENT DOCUMENTS

| | | |
|---|---|---|
| EP | 3738987 A1 | 11/2020 |
| GB | 2515337 A | 12/2014 |
| JP | 2006152289 A | 6/2006 |
| JP | 2014201688 A | 10/2014 |
| WO | 2006117156 A1 | 11/2006 |
| WO | 2017112653 A1 | 6/2017 |
| WO | 2018005350 A1 | 1/2018 |

OTHER PUBLICATIONS

Liravi Farzad et al., "A hybrid additive manufacturing method for the fabrication of silicone bio-structurs: 3D printing optimization and surface characterization", Materials and Design, vol. 138, pp. 46-61 (2017).

International Search Report for International PCT Patent Application No. PCT/EP2020/062829 dated Jul. 16, 2020.

International Search Report for International PCT Patent Application No. PCT/EP2020/062862 dated Jul. 22, 2020.

\* cited by examiner

RADIATION CURABLE COMPOSITION WITH IMPROVED MECHANICAL PROPERTIES

The present invention relates to the field of radiation curable compositions for adhesives, sealants and coating applications. In particular, the invention relates to radiation or radiation/moisture dual curable compositions, comprising at least one radiation or radiation/moisture dual curable polymers, preferably based on (meth)acrylate polymers or (meth)acrylate- and silane-terminated polymers, at least one reactive diluent, at least one photoinitiator, and at least one filler, their use as an adhesive, sealant and/or coating material, and adhesive, sealant and/or coating materials comprising said curable composition.

Radiation curable adhesives are widely used and can form crosslinks (cure) upon sufficient exposure to radiation such as electron beam radiation or actinic radiation such as ultraviolet (UV) radiation or visible light. It would be desirable to provide radiation curable polymers that allow to obtain cured materials that show elastomeric properties and have high temperature resistance.

However, a need still exists for radiation curable compositions for use in adhesives, sealants and coatings that exhibit improved performance, in particular, improved mechanical properties and storage stability. In addition, the compositions should also meet all other conventional requirements of a modern adhesive, sealant and/or coating composition.

The object of the present invention is therefore to provide a radiation curable composition having improved mechanical properties.

It has been found surprisingly that improved mechanical properties, in particular having improved tear strength, tensile strength, and elongation, are achieved by combination of radiation or radiation/moisture dual curable polymer and at least one reactive diluent. In addition, it has been found that the addition of at least one adhesion promoter can further improve long-term mechanical properties, in particular improved shear resistance after several days of curing of the composition.

In a first aspect, the present invention relates to a curable composition, comprising
a) at least one first polymer A comprising at least one terminal group of the general formula (I)

$$-A^1-C(=O)-CR^1=CH_2 \qquad (I),$$

wherein
$A^1$ is a divalent bonding group containing at least one heteroatom; and
$R^1$ is selected from hydrogen and $C_1$ to $C_4$ alkyl, preferably hydrogen or methyl; and,
optionally, at least one terminal group of the general formula (II)

$$-A^2-SiXYZ \qquad (II),$$

wherein
$A^2$ is a divalent bonding group containing at least one heteroatom; and X, Y, Z are, independently of one another, selected from the group consisting of a hydroxyl group and $C_1$ to $C_8$ alkyl, $C_1$ to $C_8$ alkoxy, and $C_1$ to $C_8$ acyloxy groups, wherein X, Y, Z are substituents directly bound with the Si atom or the two of the substituents X, Y, Z form a ring together with the Si atom to which they are bound, and at least one of the substituents X, Y, Z is selected from the group consisting of a hydroxyl group, $C_1$ to $C_8$ alkoxy and $C_1$ to $C_8$ acyloxy groups,
b) optionally, at least one second polymer B comprising at least one terminal group of the general formula (II)

$$-A^2-SiXYZ \qquad (II),$$

wherein
$A^2$ is a divalent bonding group containing at least one heteroatom; and X, Y, Z are, independently of one another, selected from the group consisting of a hydroxyl group and $C_1$ to $C_8$ alkyl, $C_1$ to $C_8$ alkoxy, and $C_1$ to $C_8$ acyloxy groups, wherein X, Y, Z are substituents directly bound with the Si atom or the two of the substituents X, Y, Z form a ring together with the Si atom to which they are bound, and at least one of the substituents X, Y, Z is selected from the group consisting of a hydroxyl group, $C_1$ to $C_8$ alkoxy and $C_1$ to $C_8$ acyloxy groups,
c) at least one reactive diluent,
d) at least one photoinitiator,
e) at least one filler,
f) optionally, at least one adhesion promoter, and
g) optionally, at least one curing catalyst.

In another aspect, the invention relates to the use of a curable composition as described herein as an adhesive, sealant, and/or coating material.

In still another aspect, the invention is directed to adhesive, sealant and/or coating materials comprising a curable composition as described herein.

A "composition" is understood in the context of the present invention as a mixture of at least two ingredients.

The term "curable" is to be understood to mean that, under the influence of external conditions, in particular under the influence of radiation and moisture present in the environment and/or supplied for the purpose, the composition can pass from a relatively flexible state, optionally possessing plastic ductility, to a harder state. In general, the crosslinking can take place by means of chemical and/or physical influences, for example, by the supply of energy in the form of heat, light or other electromagnetic radiation, but also by simply bringing the composition into contact with air, atmospheric moisture, water, or a reactive component. In the context of the present invention, "curable" predominantly relates to the property of the terminal groups of formula (I) to crosslink and of the terminal groups of formula (II) to condensate. "Radiation curable", as used herein, thus relates to curing under the influence, e.g. exposure, to radiation, such as electromagnetic radiation, in particular UV radiation or visible light. UV radiation is in the range of 100 to 400 nanometers (nm). Visible light is in the range of 400 to 780 nanometers (nm). "Moisture-curable", as used herein, thus relates to curing under the influence of moisture, typically humidity from the surrounding air.

Provided reference is made to molecular weights of oligomers or polymers in the present application, the quantities, unless otherwise stated, refer to the number average, i.e., the $M_n$ value, and not to the weight average molecular weight.

"At least one," as used herein, refers to 1 or more, i.e., 1, 2, 3, 4, 5, 6, 7, 8, 9, or more. In regard to an ingredient, the term relates to the type of ingredient and not to the absolute number of molecules. "At least one polymer" thus means, for example, at least one type of polymer, i.e., that a type of polymer or a mixture of a number of different polymers can be used. Together with weight data, the term refers to all compounds of the given type, contained in a composition/ mixture, i.e., that the composition contains no other compounds of this type beyond the given amount of the relevant compounds.

All percentage data, provided in connection with the compositions described herein, refer to % by weight, based in each case on the relevant mixture/composition, unless explicitly indicated otherwise.

"Alkyl," as used herein, refers to a saturated aliphatic hydrocarbon including straight-chain and branched-chain groups. The alkyl group preferably has 1 to 10 carbon atoms (if a numerical range, e.g., "1-10" is given herein, this means that this group, in this case the alkyl group, can have 1 carbon atom, 2 carbon atoms, 3 carbon atoms, etc., up to and including 10 carbon atoms). In particular, the alkyl can be an intermediate alkyl, which has 5 to 6 carbon atoms, or a lower alkyl, which has 1 to 4 carbon atoms, e.g., methyl, ethyl, n-propyl, isopropyl, butyl, isobutyl, tert-butyl, etc. The alkyl groups can be substituted or unsubstituted. "Substituted," as used in this connection, means that one or more carbon atoms and/or hydrogen atom(s) of the alkyl group are replaced by heteroatoms or functional groups. Functional groups that can replace the hydrogen atoms are selected particularly from =O, =S, —O—($C_{1-10}$ alkyl), —O—($C_{6-14}$ aryl), —N($C_{1-10}$ alkyl)$_2$, such as —N(CH$_3$)$_2$, —F, —Cl, —Br, —I, $C_{3-8}$ cycloalkyl, $C_{6-14}$ aryl, a 5-10-membered heteroaryl ring, in which 1 to 4 ring atoms independently are nitrogen, oxygen, or sulfur, and a 5-10-membered heteroalicyclic ring, in which 1 to 3 ring atoms are independently nitrogen, oxygen, or sulfur. Substituted alkyl includes, for example, alkylaryl groups. Heteroalkyl groups in which 1 or more carbon atoms are replaced by heteroatoms, particularly selected from O, S, N, and Si, are obtained by the replacement of one or more carbon atoms by heteroatoms. Examples of such heteroalkyl groups are, without limitation, methoxymethyl, ethoxyethyl, propoxypropyl, methoxyethyl, isopentoxypropyl, trimethoxypropylsilyl, etc. In various embodiments, substituted alkyl includes $C_{1-10}$ alkyl, preferably $C_{1-4}$ alkyl, such as propyl, substituted with aryl, alkoxy or oxyaryl. "Alkylene", as used herein, relates to the corresponding divalent alkyl group, i.e. alkanediyl.

"Alkenyl," as used herein, refers to an alkyl group, as defined herein, which consists of at least two carbon atoms and at least one carbon-carbon double bond, e.g., ethenyl, propenyl, butenyl, or pentenyl and structural isomers thereof such as 1- or 2-propenyl, 1-, 2-, or 3-butenyl, etc. Alkenyl groups can be substituted or unsubstituted. If they are substituted, the substituents are as defined above for alkyl. "Alkenyloxy" refers to an alkenyl group, as defined herein, that is linked via an —O— to the rest of the molecule. The respective term thus includes enoxy groups, such as vinyloxy (H$_2$C=CH—O—). "Alkenylene", as used herein, relates to the corresponding divalent alkenyl group.

"Alkynyl," as used herein, refers to an alkyl group, as defined herein, which consists of at least two carbon atoms and at least one carbon-carbon triple bond, e.g., ethynyl (acetylene), propynyl, butynyl, or petynyl and structural isomers thereof as described above. Alkynyl groups can be substituted or unsubstituted. If they are substituted, the substituents are as defined above for alkyl. "Alkylnyloxy" refers to an alkynyl group, as defined herein, that is linked via an —O— to the rest of the molecule. "Alkynylene", as used herein, relates to the corresponding divalent alkynyl group.

A "cycloaliphatic group" or "cycloalkyl group," as used herein, refers to monocyclic or polycyclic groups (a number of rings with carbon atoms in common), particularly of 3-8 carbon atoms, in which the ring does not have a completely conjugated pi-electron system, e.g., cyclopropyl, cyclobutyl, cyclopentyl, cyclohexyl, cyclobutenyl, cyclopentenyl, cyclohexenyl, etc. Cycloalkyl groups can be substituted or unsubstituted. "Substituted," as used in this regard, means that one or more hydrogen atoms of the cycloalkyl group are replaced by functional groups. Functional groups that can replace the hydrogen atoms are selected particularly from =O, =S, —O—($C_{1-10}$ alkyl), —O—($C_{6-14}$ aryl), —N($C_{1-10}$ alkyl)$_2$, such as —N(CH$_3$)$_2$, —F, —Cl, —Br, —I, —COOH, —CONH$_2$, —$C_{1-10}$ alkyl or alkoxy, $C_{2-10}$ alkenyl, $C_{2-10}$ alkynyl, $C_{3-8}$ cycloalkyl, $C_{6-14}$ aryl, a 5-10-membered heteroaryl ring, in which 1 to 4 ring atoms independently are nitrogen, oxygen, or sulfur, and a 5-10-membered heteroalicyclic ring, in which 1 to 3 ring atoms independently are nitrogen, oxygen, or sulfur. "Cycloalkyloxy" refers to a cycloalkyl group, as defined herein, that is linked via an —O— to the rest of the molecule. "Cycloalkylene", as used herein, relates to the corresponding divalent cycloalkyl group.

"Aryl," as used herein, refers to monocyclic or polycyclic groups (i.e., rings that have neighboring carbon atoms in common), particularly of 6 to 14 carbon ring atoms which have a completely conjugated pi-electron system. Examples of aryl groups are phenyl, naphthalenyl, and anthracenyl. Aryl groups can be substituted or unsubstituted. If they are substituted, the substituents are as defined above for cycloalkyl. "Aryloxy" refers to an aryl group, as defined herein, that is linked via an —O— to the rest of the molecule. "Arylene", as used herein, relates to the corresponding divalent aryl group.

A "heteroaryl" group, as used herein, refers to a monocyclic or polycyclic (i.e., rings that share an adjacent ring atom pair) aromatic ring, having particularly 5 to 10 ring atoms, where one, two, three, or four ring atoms are nitrogen, oxygen, or sulfur and the rest is carbon. Examples of heteroaryl groups are pyridyl, pyrrolyl, furyl, thienyl, imidazolyl, oxazolyl, isoxazolyl, thiazolyl, isothiazolyl, pyrazolyl, 1,2,3-triazolyl, 1,2,4-triazolyl, 1,2,3-oxadiazolyl, 1,2,4-oxadiazolyl, 1,2,5-oxadiazolyl, 1,3,4-oxadiazolyl, 1,3,4-triazinyl, 1,2,3-triazinyl, benzofuryl, isobenzofuryl, benzothienyl, benzotriazolyl, isobenzothienyl, indolyl, isoindolyl, 3H-indolyl, benzimidazolyl, benzothiazolyl, benzoxazolyl, quinolizinyl, quinazolinyl, phthalazinyl, quinoxalinyl, cinnolinyl, naphthyridinyl, quinolyl, isoquinolyl, tetrazolyl, 5,6,7,8-tetrahydroquinolyl, 5,6,7,8-tetrahydroisoquinolyl, purinyl, pteridinyl, pyridinyl, pyrimidinyl, carbazolyl, xanthenyl, or benzoquinolyl. Heteroaryl groups can be substituted or unsubstituted. If they are substituted, the substituents are as defined above for cycloalkyl. "(Hetero) aryl", as used herein, refers to both aryl and heteroaryl groups as defined herein. "Heteroaryloxy" refers to a heteroaryl group, as defined herein, that is linked via an —O— to the rest of the molecule.

A "heteroalicyclic group" or a "heterocycloalkyl group," as used herein, refers to a monocyclic or fused ring having 5 to 10 ring atoms, which contains one, two, or three heteroatoms, selected from N, O, and S, whereby the rest of the ring atoms are carbon. A "heterocycloalkenyl" group contains in addition one or more double bonds. The ring however has no completely conjugated pi-electron system. Examples of heteroalicyclic groups are pyrrolidinone, piperidine, piperazine, morpholine, imidazolidine, tetrahydropyridazine, tetrahydrofuran, thiomorpholine, tetrahydropyridine, and the like. Heterocycloalkyl groups can be substituted or unsubstituted. If they are substituted, the substituents are as defined above for cycloalkyl. "Heteroalicyclic" refers to a heteroalicyclic group, as defined herein, that is linked via an —O— to the rest of the molecule.

"Substituted" in relation to hydrocarbon moieties, as used herein, has the meaning provided above depending on the type of the hydrocarbon moiety. Accordingly, the hydrocarbon moiety may be an alkyl, alkenyl, alkynyl, cycloaliphatic or aryl group, as defined above, or the bivalent or polyvalent variants thereof, that may be substituted or unsubstituted, as defined above.

Being a "bond" or "covalent bond" means that the respective moiety is essentially absent, i.e. that the remaining structural elements are directly linked to the next structural element.

The curable composition according to the invention comprises at least one first polymer A comprising at least one terminal group of the general formula (I) as defined herein and, optionally, at least one terminal group of the general formula (II) as defined herein.

The polymer A of the invention comprises at least one terminal group of the general formula (I)

$$-A^1-C(=O)-CR^1=CH_2 \quad (1),$$

wherein
$A^1$ is a divalent bonding group containing at least one heteroatom; and
$R^1$ is selected from hydrogen and $C_1$ to $C_4$ alkyl, preferably hydrogen or methyl.

The presence of the terminal group of the general formula (I) imparts the polymer with radiation curing properties, such that the curable polymer is in fact a radiation curable polymer. Herein, the at least one polymer A is also referred to as "radiation curable polymer".

To obtain radiation and moisture dual curing properties, the radiation curable polymer A can further comprise at least one terminal group of the general formula (II)

$$-A^2-SiXYZ \quad (II),$$

wherein
$A^2$ is a divalent bonding group containing at least one heteroatom; and
X, Y, Z are, independently of one another, selected from the group consisting of a hydroxyl group and $C_1$ to $C_8$ alkyl, $C_1$ to $C_8$ alkoxy, and $C_1$ to $C_8$ acyloxy groups, wherein X, Y, Z are substituents directly bound with the Si atom or the two of the substituents X, Y, Z form a ring together with the Si atom to which they are bound, and at least one of the substituents X, Y, Z is selected from the group consisting of a hydroxyl group, $C_1$ to $C_8$ alkoxy and $C_1$ to $C_8$ acyloxy groups.

The composition according to the invention can additionally comprise at least one second polymer B comprising at least one terminal group of the general formula (II) as defined above.

In various embodiments, it may be advantageous that both types of terminal groups of the general formula (I) and the general formula (II) are present in the composition of the invention, as this imparts dual curing properties to the polymer. This is advantageous, as the radiation curing provides a fast curing mechanism important for stability of the composition and the moisture curing provides for a slower curing mechanism that provides the object with the final properties, such as tear strength, tensile strength, elasticity.

In the following, all definitions of the linking and terminal groups apply to polymers A and B, insofar applicable.

In various embodiments, the divalent linking group $A^1$ of the general formula (I) and/or $A^2$ of the general formula (II) comprises a substituted or unsubstituted ether, amide, carbamate, urethane, urea, imino, siloxane, carboxylate, carbamoyl, amidino, carbonate, sulfonate or sulfinate group, preferably a urea and/or urethane group. "Substituted" in relation to these groups means that a hydrogen atom present in these groups may be replaced by a non-hydrogen moiety, such as alkyl, for example $C_1$ to $C_4$ alkyl. While $A^1$ and/or $A^2$ may be any one of the listed groups, in various embodiments, they comprise further structural elements, such as further linking groups that link the listed functional group to the polymer and/or the terminal group.

Generally, in various embodiments, the divalent linking group $A^1$ of the general formula (I) and $A^2$ of the general formula (II) are generated in a capping reaction in which the polymer termini are reacted with a compound results in the terminal groups of formulae (I) and (II). In various embodiments, the polymers are provided in a hydroxyl (OH) terminated form and thus provide reactive groups on their termini that can be used for the capping reaction. In various embodiments, the terminal groups of the polymer backbone, such as hydroxyl groups, may be first functionalized with a polyisocyanate, such as a diisocyanate or triisocyanate, such as those described below, such that an NCO-terminated polymer is generated. This may then in the next step be reacted with an (meth)acrylate/silane that comprises an NCO-reactive group, such as an amino or hydroxyl group, preferably a hydroxy-modified (meth)acrylate and/or an aminosilane. The urethane and urea groups resulting from such a reaction advantageously increase the strength of the polymer chains and of the overall crosslinked polymer.

"Polyisocyanate", as used herein, is understood to be a compound which has at least two isocyanate groups —NCO. This compound does not have to be a polymer, and instead is frequently a low molecular compound.

The polyisocyanates suitable according to the invention include ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3-and -1,4-diisocyanate, bis(2-isocyanatoethyl)fumarate, 1-isocyanato-3,3,5-trimethyl-5-isocyanatomethylcyclohexane (isophorone diisocyanate, IPDI), 2,4- and 2,6-hexahydrotoluylene diisocyanate, hexahydro-1,3- or -1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluylene diisocyanate (TDI), 2,4'-diphenylmethane diisocyanate, 2,2'-diphenylmethane diisocyanate, or 4,4'-diphenylmethane diisocyanate (MDI), and the isomeric mixtures thereof. Also suitable are partially or completely hydrogenated cycloalkyl derivatives of MDI, for example completely hydrogenated MDI ($H_{12}$-MDI), alkyl-substituted diphenylmethane diisocyanates, for example mono-, di-, tri-, or tetraalkyldiphenylmethane diisocyanate and the partially or completely hydrogenated cycloalkyl derivatives thereof, 4,4'-diisocyanatophenylperfluorethane, phthalic acid-bis-isocyanatoethyl ester, 1 chloromethylphenyl-2,4- or -2,6-diisocyanate, 1-bromomethylphenyl-2,4- or -2,6-diisocyanate, 3,3'-bis-chloromethyl ether-4,4'-diphenyl diisocyanate, sulfur-containing diisocyanates such as those obtainable by reacting 2 moles diisocyanate with 1 mole thiodiglycol or dihydroxydihexyl sulfide, diisocyanates of dimer fatty acids, or mixtures of two or more of the named diisocyanates. The polyisocyanate is preferably IPDI, TDI or MDI.

Other polyisocyanates suitable for use in accordance with the invention are isocyanates with a functionality of three or more obtainable, for example, by oligomerization of diisocyanates, more particularly by oligomerization of the isocyanates mentioned above. Examples of such tri- and higher isocyanates are the triisocyanurates of HDI or IPDI or mixtures thereof or mixed triisocyanurates thereof and polyphenyl methylene polyisocyanate obtainable by phosgenation of aniline/formaldehyde condensates.

Accordingly, in some embodiments, $A^1$ is a group of formula (III)

     (III)

wherein
  $R^{11}$, $R^{12}$, and $R^{13}$ are independently a bond or a divalent substituted or unsubstituted hydrocarbon residue with 1 to 20 carbon atoms, preferably a substituted or unsubstituted (cyclo)alkylene or arylene residue with 1 to 14 carbon atoms;
  $A^{11}$ and $A^{12}$ are each independently a divalent group selected from —O—C(=O)—NH—, —NH—C(=O)—O—, —NH—C(=O)—NH—, —NR"—C(=O)—NH—, —NH—C(=O)—NR"—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—S—, —O—, and —NR"—, wherein R" can be hydrogen or a hydrocarbon moiety with 1 to 12 carbon atoms, optionally substituted, preferably $C_1$-$C_2$ alkyl or hydrogen; and n is 0 or 1.

"(Cyclo)alkylene", as used herein, means a cycloalkylene or alkylene group.

For example, $R^{11}$ being a bond means that the structural element $A^{11}$ is directly bound to the polymer backbone, while $R^{13}$ being a bond and n being 0 means that $A^{11}$ is directly bound to the remaining part of the terminal group of formula (I), i.e. —C(=O)—CR$^1$=CH$_2$.

"Substituted" in relation to the (cyclo)alkylene or arylene groups has the same meaning as disclosed above in relation to alkyl, cycloalkyl and aryl groups. In some embodiments, in particular if $R^{13}$ is concerned, it also encompasses that the substituent is or comprises another group of the formula —C(=O)—CR$^1$=CH$_2$. It is however preferred that each group of formula (I) does contain only 1 or 2 groups of the structure —C(=O)—CR$^1$=CH$_2$, preferably only 1. In some embodiments, in particular if $R^{12}$ is concerned, it also encompasses that the substituent is or comprises another group of the formula -$A^{12}$-$R^{13}$— with this $R^{13}$ also being linked to a group of formula (I). These structures may, for example, be generated if a triisocyanate is used.

If n=0, this means that $A^{12}$ and $R^{12}$ are absent and $A^{11}$ is directly linked to $R^{13}$.

In any case, the orientation of the structural element of formula (III) is such that $R^{13}$ links to the structural element —C(=O)—CR$^1$=CH$_2$ of the group of formula (I), or if not present, $A^{12}$ or $A^{11}$.

In various embodiments, $R^{11}$ is a bond or a divalent substituted or unsubstituted hydrocarbon residue with 1 to 20 carbon atoms, preferably an unsubstituted alkylene residue with 1 to 4 carbon atoms, for example methylene, 1,2-ethylene, 1,3-propylene or 1,4-butylene; $A^{11}$ is a divalent group selected from —O—C(=O)—NH—, —NH—C(=O)—NH—, and —NR"—C(=O)—NH—, preferably —O—C(=O)—NH—; $R^{13}$ is a bond or a divalent substituted or unsubstituted hydrocarbon residue with 1 to 20 carbon atoms, preferably a substituted or unsubstituted alkylene residue with 1 to 8 carbon atoms, such as ethylene (—CH$_2$—CH$_2$—), propylene or butylene; and n is 0 or 1.

If, in the above embodiments, n is 1, $R^{12}$ may be a divalent substituted or unsubstituted hydrocarbon residue with 1 to 20 carbon atoms, preferably a substituted or unsubstituted (cyclo)alkylene residue or arylene residue with 1 to 14 carbon atoms; and $A^{12}$ may be a divalent group selected from —NH—C(=O)—O—, —NH—C(=O)—NH—, and —NH—C(=O)—NR"—, preferably —NH—C(=O)—O—.

In various embodiments, the structural element of formula (III) arises from the reaction of a diisocyanate with a hydroxyl-terminated polymer and, in a second step, the resulting NCO-terminated polymer with a hydroxyl group containing (meth)acrylate. In such embodiments, $R^{11}$ may be a bond or alkylene, $A^{11}$ is —O—C(=O)—NH—, $R^{12}$ is the NCO-bearing residue of the diisocyanate, $A^{12}$ is —NH—C(=O)—O— and $R^{13}$ is the remaining structural element of the hydroxy-modified (meth)acrylate ester part. In these embodiments, $R^{12}$ may be a divalent (1,3,3-trimethylcyclohexyl)methylene group (if IPDI is used as the diisocyanate), 1-methyl-2,4-phenylene (if TDI is used as the diisocyanate) and any other divalent group remaining if any one of the diisocyanates disclosed herein is used. In various embodiments, $R^{13}$ is the remainder of the hydroxyester group of the (meth)acrylate used, for example ethyl, if 2-hydroxyethyl (meth)acrylate was used, or n-butyl, if 4-hydroxybutyl (meth)acrylate was used, or 3-(phenoxy)-2-propyl, if 2-hydroxy-3-phenoxy(meth)acrylate was used.

In various embodiments, preferred diisocyanates used include IPDI, so that $R^{12}$ is 1,3,3-trimethylcyclohexyl)methylene-4-yl.

In various embodiments, the (meth)acrylates used include, without limitation, 2-hydroxyethylacrylate and -methacrylate, 3-hydroxypropylmethacrylate, 4-hydroxybutylacrylate, and 2-hydroxy-3-phenoxyacrylate, so that $R^{13}$ is preferably ethyl, propyl, butyl or 3-(phenoxy)-2-propyl.

In other embodiments, n is 0. In such embodiments, $R^{11}$ can be a bond, $A^{11}$ is —O—C(=O)—NH— and $R^{13}$ is typically an alkylene moiety, such a methylene, ethylene or propylene. In such embodiments, the linking group results from the reaction of an isocyanatoacrylate with a hydroxy-terminated polymer.

In various embodiments, $A^2$ is a group of formula (IV)

     (IV)

wherein
  $R^{21}$, $R^{22}$, and $R^{23}$ are independently a bond or a divalent substituted or unsubstituted hydrocarbon residue with 1 to 20 carbon atoms, preferably a substituted or unsubstituted (cyclo)alkylene or arylene residue with 1 to 14 carbon atoms;
  $A^{21}$ and $A^{22}$ are each independently a divalent group selected from —O—C(=O)—NH—, —NH—C(=O)—O—, —NH—C(=O)—NH—, —NR"—C(=O)—NH—, —NH—C(=O)—NR"—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—S—, —O—, and —NR"—, wherein R" can be hydrogen or a hydrocarbon moiety with 1 to 12 carbon atoms, optionally substituted, preferably $C_1$-$C_2$ alkyl or hydrogen; and
  m is 0 or 1.

Here, the same definitions for "bond" and "substituted", as disclosed above for formula (III), apply, with the only difference being that "substituted" also encompasses that the substituent, in particular of $R^{23}$, is another group of the formula —SiXYZ instead of —C(=O)—CR$^1$=CH$_2$. Again, in various embodiments, it is also encompassed that R$^{22}$ is substituted with another -A$^{22}$-R$^{23}$ moiety, with said R$^{23}$ being linked to another group of formula (II).

If n=0, this means that A$^{22}$ and R$^{22}$ are absent and A$^{21}$ is directly linked to R$^{23}$.

In any case, the orientation of the structural element of formula (IV) is such that R$^{23}$ links to the structural element —SiXYZ of the group of formula (II), or if not present, A$^{22}$ or A$^{21}$.

In various embodiments, R$^{21}$ is a bond or a divalent substituted or unsubstituted hydrocarbon residue with 1 to 20 carbon atoms, preferably an unsubstituted alkylene residue with 1 to 4 carbon atoms, for example methylene, ethylene, propylene, preferably a bond; R$^{23}$ is a bond or a divalent substituted or unsubstituted hydrocarbon residue with 1 to 20 carbon atoms, preferably an unsubstituted alkylene residue with 1 to 3 carbon atoms, more preferably methylene or propylene; and n is 0 or 1,
  wherein if n is 0, A$^{21}$ is a divalent group selected from —O—, —O—C(=O)—NH—, —NH—C(=O)—NH—, and —NR"—C(=O)—NH—, preferably —O—, —O—C(=O)—NH—, or NH—C(=O)—NH—; and wherein if n is 1, A$^{21}$ is a divalent group selected from —O—, —O—C(=O)—NH—, —NH—C(=O)—NH—, and —NR"—C(=O)—NH—, preferably —O—C(=O)—NH; R$^{22}$ is a divalent substituted or unsubstituted hydrocarbon residue with 1 to 20 carbon atoms, preferably a substituted or unsubstituted (cyclo)alkylene residue or arylene residue with 1 to 14 carbon atoms; and A$^{22}$ is a divalent group selected from —NH—C(=O)O—, —NH—C(=O)—NH—, and —NH—C(=O)—NR"—, preferably —NH—C(=O)—NH.

Such linking groups arise from the reaction of a hydroxy-terminated polymer with a diisocyanate, as defined above for the (meth)acrylate terminal groups, and the subsequent reaction of the NCO-terminated polymer with an NCO-reactive silane, such as an hydroxysilane or, preferably an aminosilane. Suitable aminosilanes are well known in the art and include, without limitation, 3-aminopropyltrimethoxysilane as well as those disclosed below in relation to the inventive methods.

In various embodiments, R$^{11}$, R$^{21}$ and R$^{23}$ in the general formulae (III) and/or (IV) are selected from a bond, methylene, ethylene, or n-propylene group. R$^{11}$ and R$^{21}$ are preferably a bond. R$^{23}$ is preferably 1,3-propylene.

Alkoxysilane-terminated compounds having a methylene group as binding link to the polymer backbone—so-called "alpha-silanes"—have a particularly high reactivity of the terminating silyl group, leading to reduced setting times and thus to very rapid curing of formulations based on these polymers.

In general, a lengthening of the binding hydrocarbon chain leads to reduced reactivity of the polymers. In particular, "gamma-silanes"—which comprise the unbranched propylene residue as binding link—have a balanced ratio between necessary reactivity (acceptable curing times) and delayed curing (open assembly time, possibility of corrections after bonding). By carefully combining alpha- and gamma-alkoxysilane-terminated building blocks, therefore, the curing rate of the systems can be influenced as desired.

The substituents X, Y and Z are, independently of one another, selected from the group consisting of a hydroxyl group and $C_1$ to $C_8$ alkyl, $C_1$ to $C_8$ alkoxy, and $C_1$ to $C_8$ acyloxy groups, wherein at least one of the substituents X, Y, Z here must be a hydrolyzable group, preferably a $C_1$ to $C_8$ alkoxy or a $C_1$ to $C_8$ acyloxy group, wherein the substituents X, Y and Z are directly bound with the Si atom or the two of the substituents X, Y, Z form a ring together with the Si atom to which they are bound. In preferred embodiments, X, Y and Z are the substituents directly bound with the SI atom. As hydrolyzable groups, preferably alkoxy groups, in particular methoxy, ethoxy, i-propyloxy and i-butyloxy groups, are selected. This is advantageous, since no substances which irritate mucous membranes are released during the curing of compositions comprising alkoxy groups. The alcohols formed by hydrolysis of the residues are harmless in the quantities released, and evaporate. However, acyloxy groups, such as an acetoxy group —O—CO—CH$_3$, can also be used as hydrolyzable groups.

As described above, in certain embodiments, the polymer(s) A has/have at least one terminal groups of the general formula (II). Each polymer chain thus comprises at least one linking point at which the condensation of the polymers can be completed, splitting off the hydrolyzed residues in the presence of atmospheric moisture. In this way, regular and rapid crosslinkability is achieved so that bonds with good strengths can be obtained. In addition, by means of the quantity and the structure of the hydrolyzable groups—for example by using di- or trialkoxysilyl groups, methoxy groups or longer residues—the configuration of the network that can be achieved as a long-chain system (thermoplastics), relatively wide-mesh three-dimensional network (elastomers) or highly crosslinked system (thermosets) can be controlled, so that inter alia the elasticity, flexibility and heat resistance of the finished crosslinked compositions can be influenced in this way. In alternative embodiments, these properties can—at least partially—also be provided by additionally using a polymer B, as defined herein.

In preferred embodiments, in the general formula (II), X is preferably an alkyl group and Y and Z are, each independently of one another, an alkoxy group, or X, Y and Z are, each independently of one another, an alkoxy group. In general, polymers comprising di- or trialkoxysilyl groups have highly reactive linking points which permit rapid curing, high degrees of crosslinking and thus good final strengths. The particular advantage of dialkoxysilyl groups lies in the fact that, after curing, the corresponding compositions are more elastic, softer and more flexible than systems comprising trialkoxysilyl groups.

With trialkoxysilyl groups, on the other hand, a higher degree of crosslinking can be achieved, which is particularly advantageous if a harder, stronger material is desired after curing. In addition, trialkoxysilyl groups are more reactive and therefore crosslink more rapidly, thus reducing the quantity of catalyst required, and they have advantages in "cold flow"—the dimensional stability of a corresponding adhesive under the influence of force and possibly temperature.

Particularly preferably, the substituents X, Y and Z in the general formula (II) are, each independently of one another, selected from a hydroxyl, a methyl, an ethyl, a methoxy or an ethoxy group, at least one of the substituents being a hydroxyl group, or a methoxy or an ethoxy group, preferably a methoxy group. Methoxy and ethoxy groups as comparatively small hydrolyzable groups with low steric bulk are very reactive and thus permit a rapid cure, even with low use of catalyst. They are therefore of particular interest for systems in which rapid curing is desirable.

Interesting configuration possibilities are also opened up by combinations of the two groups. If, for example, methoxy is selected for X and ethoxy for Y within the same alkoxysilyl group, the desired reactivity of the terminating silyl groups can be adjusted particularly finely if silyl groups carrying exclusively methoxy groups are deemed too reactive and silyl groups carrying ethoxy groups not reactive enough for the intended use.

In addition to methoxy and ethoxy groups, it is of course also possible to use larger residues as hydrolyzable groups, which by nature exhibit lower reactivity. This is of particular interest if delayed curing is also to be achieved by means of the configuration of the alkoxy groups.

In various embodiments, in formula (II), X, Y, and Z are, independently of one another, preferably selected from a hydroxyl, a methyl, an ethyl, a methoxy, or an ethoxy group, wherein at least one of the substituents is a hydroxyl group, or a methoxy or an ethoxy group, preferably all are selected from methoxy or ethoxy, more preferably methoxy. Explicitly covered are thus methyldimethoxysilyl, trimethoxysilyl, triethoxysilyl, and ethyldiethoxysilyl, preferably methyldimethoxysilyl and trimethoxysilyl, more preferably trimethoxysilyl.

It is understood that in case polymer A comprises terminal groups of formula (II) and at least one polymer B is additionally present, the respective terminal groups of formula (II) may be selected independently for polymer A and polymer B and thus allow to further tune composition properties.

The polymers A and B can be obtained according to any one of the methods described in the EP patent application no. 19174114.9, the content of which is herein incorporated by reference in its entirety. Depending on the method used and the compounds used therein, these methods result not only in polymers that contain varying amounts of the terminal groups of formula (I) but also polymers that contain both groups of formula (I) and groups of formula (II) as well as polymers that only comprise terminal groups of formula (II). Such mixtures of polymers that comprise both types of endgroups have the desired dual curing properties described above. It is in any case preferred that these mixtures of polymers do comprise polymers that have endgroups of formula (I) and preferably also formula (II) on the same polymer chain.

In preferred embodiments of the invention, the polymer backbone of the at least one first polymer A and the optional at least one second polymer B are independently selected from the group consisting of polyoxyalkylenes, poly(meth) acrylates, polyesters, and combinations thereof, preferably selected from polyoxyalkylenes. Preferably, the polymer A and the optional polymer B are linear polymers.

A "polyoxyalkylene", "polyalkylene glycol" or "polyether", as used interchangeably herein, is understood to be a polymer in which the organic repeating units comprise ether functionalities C—O—C in the main chain. Polymers having lateral ether groups, such as cellulose ethers, starch ethers and vinyl ether polymers, as well as polyacetals such as polyoxymethylene (POM) are not included in the polyethers. Examples for such polymers are polypropylene and polyethylene and copolymers thereof.

In various embodiments, the polymer has a polyoxyethylene backbone, polypropylene backbone, or polyoxyethylene-polyoxypropylene backbone, preferably a polyoxypropylene backbone.

A "poly(meth)acrylic acid (ester)" is understood to be a polymer based on (meth)acrylic acid (esters), which therefore has as a repeating unit the structural motif —$CH_2$—$CR^a(COOR^b)$—, where Ra denotes a hydrogen atom (acrylic acid ester) or a methyl group (methacrylic acid ester) and $R^b$ denotes hydrogen or linear alkyl residues, branched alkyl residues, cyclic alkyl residues and/or alkyl residues comprising functional substituents, for example methyl, ethyl, isopropyl, cyclohexyl, 2-ethylhexyl or 2-hydroxyethyl residues.

The polymer having at least one terminal group of the general formula (I) and/or (II), i.e., the at least one first polymer A and/or the at least one second polymer B, is particularly preferably a polyether. Polyethers have a flexible and elastic structure, with which compositions having excellent elastic properties can be produced. Polyethers are not only flexible in their backbone, but at the same time strong. Thus, for example, polyethers are not attacked or decomposed by water and bacteria, in contrast to, e.g., polyesters, for example.

The number average molecular weight $M_n$ of the polyether on which the polymer is based is preferably at least 500 g/mol, such as 500 to 100000 g/mol (daltons), particularly preferably at least 700 g/mol and in particular at least 1000 g/mol. For example, the number average molecular weight $M_n$ of the polyether is 500 to 5000, preferably 700 to 40000, particularly preferably 1000 to 30000 g/mol. These molecular weights are particularly advantageous, since the corresponding compositions have a balanced ratio of viscosity (ease of processing), strength and elasticity. It is further preferable that the polyethers have a molecular weight $M_n$ of at least 500 g/mol, as lower molecular weights lead to high concentrations of urethane bonds and thus undesired hydrogen bonding, which can cause the formulation to be in a solid state, which is undesirable.

Particularly advantageous viscoelastic properties can be achieved if polyethers having a narrow molecular weight distribution, and thus low polydispersity, are used. These can be produced, for example, by so-called double metal cyanide catalysis (DMC catalysis). Polyethers produced in this way are distinguished by a particularly narrow molecular weight distribution, by a high average molecular weight and by a very low number of double bonds at the ends of the polymer chains.

In a special embodiment of the present invention, the maximum polydispersity $M_w/M_n$ of the polyether on which the polymer is based is therefore 3, particularly preferably 1.7 and most particularly preferably 1.5. The number average molecular weight $M_n$, as well as the weight average molecular weight $M_w$, is determined according to the present invention by gel permeation chromatography (GPC, also known as SEC) at 23° C. using a styrene standard. The molecular weight can be determined by gel permeation chromatography (GPC) with tetrahydrofuran (THF) as the eluent according to DIN 55672-1:2007-08, preferably at 23° C. or 35° C. Molecular weights of monomeric compounds are calculated based on the respective molecular formula and the known molecular weights of the individual atoms. These methods are known to one skilled in the art. The polydispersity is derived from the average molecular weights $M_w$ and $M_n$. It is calculated as PD=$M_w/M_n$.

The ratio $M_w/M_n$ (polydispersity) indicates the width of the molecular weight distribution and thus of the different degrees of polymerization of the individual chains in polydisperse polymers. For many polymers and polycondensates, a polydispersity value of about 2 applies. Strict monodispersity would exist at a value of 1. A low polydispersity of, for example, less than 1.5 indicates a comparatively narrow molecular weight distribution, and thus the specific expression of properties associated with molecular weight, such as e.g., viscosity. In particular, therefore, in the context of the present invention, the polyether on which the polymer A is based has a polydispersity ($M_w/M_n$) of less than 1.3.

In various embodiments, the polymers can have a polyester backbone. Polyesters are typically polymers obtained by reaction of polycarboxylic acids with polyols, such as succinic acid or adipic acid with butane diol or hexane diol. For the polyesters, the same definitions as to preferred molecular weights and polydispersity given above for the polyethers apply.

In various embodiments, the polyether or polyester polymer having at least one terminal group of the general formula (I) and/or (II), can be derived from a polyol or a mixture of two or more polyols, typically polyether polyols or polyester polyols.

A "polyol" is understood to be a compound which contains at least two OH groups, irrespective of whether the compound contains other functional groups. However, a polyol used in accordance with the present invention for the preparation of the inventive polymers preferably contains only OH groups as functional groups or, if other functional groups are present, none of these other functional groups are reactive at least to isocyanates under the conditions prevailing during the reactions of the polyol(s) and polyisocyanate(s) described herein.

The polyols suitable according to the invention are preferably polyether polyols. The above descriptions about the molecular weight and polydispersity of the polyether apply to the polyether polyols. The polyether polyol is preferably a polyalkylene oxide, particularly preferably polyethylene oxide and/or polypropylene oxide. In preferred embodiments, a polyether or a mixture of two polyethers are used.

The polyols to be used in accordance with the invention have an OH value of preferably about 5 to about 15 and, more preferably, of about 10. The percentage content of primary OH groups should be below about 20%, based on all the OH groups, and is preferably below 15%. In one particularly advantageous embodiment, the acid value of the polyethers used is below about 0.1, preferably below 0.05 and, more preferably, below 0.02.

Besides the polyethers, the polyol mixture may contain other polyols. For example, it may contain polyester polyols with a molecular weight of at least about 500 to about 50,000.

Generally, while all the polymers described above can have multiple reactive termini that are used for the attachment of the terminal groups described herein, such as multiple hydroxyl groups, thus being polyols, it may be preferable that they comprise two or three such reactive terminal groups for attachment of the terminal groups of formulae (I) and (II), preferably only two, thus being linear polymers. Particularly preferred are di-functional and tri-functional polymers, such as diols and/or triols, more preferred are di-functional polymers, such as diols, optionally in combination with tri-functional polymers, such as triols. If tri-functional polymers, such as triols, are used, these are preferably used in combination with di-functional polymers, such as diols, for example in a 1:1 molar ratio, more preferably in a 1:>1 molar ratio. Accordingly, in some embodiments, the polymers used are diols or diol/triol combinations with the given ratios.

It is generally preferred that if the polymers described herein, in particular the polyethers, include polyfunctional polymers, i.e. polymers having more than two reactive terminal groups, then these are present only in combination with polymers having a maximum of two reactive terminal groups. In such mixtures of polymers, the amount of difunctional polymers is preferably at least 50 mol-%, while the amount of tri- or higher functional polymers is preferably less than 50 mol-%, more preferably less than 45 mol-% or less than 40 mol-% or less than 35 mol-% or less than 30 mol-% or less than 25 mol-% or even less than 20 mol-%. Higher amounts of polyfunctional polymers may lead to an undesired degree of crosslinking already at the stage of generating the polymers of the invention.

In various embodiments, the radiation curable polymer, i.e., the polymer A, may comprise at least two, for example 2 or 3 or 4 or more terminal groups of the general formula (I). In addition to these, the polymer may further comprise at least one terminal group of formula (II), for example 1, 2 or more. In various embodiments, the polymer may comprise at least one terminal group of formula (I), for example 1, 2 or 3, and at least one terminal group of formula (II), for example 1, 2 or 3. In some embodiments, the polymer is a linear polymer and thus comprises only two terminal groups. These may be of formula (I) or formula (I) and formula (II).

Accordingly, in various embodiments, the radiation curable polymer comprises
(i) two or three, preferably two, terminal groups of formula (I), or
(ii) one terminal group of formula (I) and one or two, preferably one, terminal group of formula (II), or
(iii) two terminal groups of formula (I) and one terminal group of formula (II).

While it is possible to indicate the number of terminal groups of each formula for a single polymer molecule, it is understood that, depending on the process of manufacture, the obtained population of polymers may vary in their structure with regard to the terminal groups, as it may be possible that such a process generates polymers that have only terminal groups of the general formula (I), polymers that have only terminal groups of the general formula (II), or polymers that have both types of terminal groups.

In preferred embodiments, the total proportion of the terminal groups of the general formula (I) is 1 to 100 mol-%, more preferably 50 to 100 mol-%, and the total proportion of the terminal groups of the general formula (II) is 99 to 0 mol-%, more preferably 50 to 0 mol-%, wherein the proportion relates to the total amounts of the terminal groups of the general formulae (I) and (II) of the polymer A and the optional polymer B in the composition according to the invention. In particularly preferred embodiments, the total proportion of the terminal groups of the general formula (I) is higher than the total proportion of the terminal groups of the general formula (II), i.e., the molar ratio of the terminal groups of formula (I) and (II) in the polymers of the invention is >1:1. Excess amount of the terminal groups of the general formula (I) can further improve the storage stability of the composition of the invention. In various embodiments, the molar ratio of terminal groups of formula (I) and (II) in the polymers of the invention is >1:1, for example at least 1.5:1, at least 2:1, at least 2.1:1, at least 2.2:1, or at least 2.4:1. The molar ratio may, in certain embodiments, be not higher than 20:1 or not higher than 15:1 or not higher than 10:1.

In case the composition according to the invention comprises at least one polymer A as defined herein and does not comprise the optional second polymer B, the polymer A can comprise 1 to 100 mol-%, preferably 50 to 100 mol-%, of terminal groups of the general formula (I) and 99 to 0 mol-%, preferably 50 to 0 mol-%, of terminal groups of the general formula (II). For example, in a linear polymer having one terminal group of the general formula (I) and one terminal group of the general formula (II), the mol-% of both groups would thus be 50%.

In case the composition according to the invention comprises at least one first polymer A and at least one second polymer B as defined herein, the above given percentages regarding the percentage of the respective terminal groups still apply but then relate to the total number of terminal groups in the given population of the polymers A and B.

While in the above embodiments, it is possible that the at least one polymer A only comprises terminal groups of formula (I) and the composition comprises the at least one polymer B, the at least one polymer B may also be additionally present in the composition in case the at least one polymer A comprises both types of terminal groups, i.e. groups of formulae (I) and (II).

In various embodiments, the polymer A comprises at least one terminal group of the general formula (II) and/or the curable composition of the invention comprises at least one second polymer B comprising at least one terminal group of the general formula (II) so that both types of terminal groups are present in the composition.

In various embodiments, the at least one polymer A comprising at least one terminal group of the general formula (I) may be combined with at least one second polymer B comprising at least one terminal group of the general formula (II). The polymer backbone of this at least one polymer B may also be selected from the group consisting of polyoxyalkylenes, poly(meth)acrylates, polyesters, and combinations thereof, but this is independent from the backbone of the polymer A. However, in various embodiments if two different polymers A and B are used in the composition, the backbones may be the same type of polymer backbone. In preferred embodiments, both polymers have polyether backbones. In other, alternative embodiments, the at least one polymer B has a backbone different from those listed above, such as a polysiloxane backbone, for example a polydimethylsiloxane (PDMS) backbone.

In preferred embodiments, Polymers A and/or B are in typically contained in the compositions of the invention in amounts of from 15 to 90% wt.-%, preferably from 20 to 70 wt.-%, more preferably from 25 to 65 wt.-%. These amounts relate to the total amounts of all polymers A and B in the compositions.

The curable composition according to the invention comprises at least one reactive diluent. The reactive diluent is particularly beneficial for improving the mechanical properties of the cured compositions.

All compounds that are miscible with the composition and provide a reduction in viscosity and that possess at least one group that is reactive or can form bonds with the composition can be used as reactive diluents. The viscosity of the reactive diluent is preferably less than 20,000 mPas, particularly preferably from 0.1 to 6000 mPas, most particularly preferably from 1 to 1000 mPas (Brookfield RVT, 23° C., spindle 7, 10 rpm).

In preferred embodiments, the reactive diluent can be selected from the group consisting of mono-functional (meth)acrylates, (meth)acrylamides, (meth)acrylic acid and combinations thereof. Illustrative examples of useful mono-functional (meth)acrylates, include alkyl (meth)acrylates, cycloalkyl (meth)acrylates, alkenyl (meth)acrylates, heterocycloalkyl (meth)acrylates, heteroalkyl methacrylates, alkoxy polyether mono(meth)acrylates.

The alkyl group on the (meth)acrylate desirably may be a substituted or unsubstituted alkyl group having 1 to 20 carbon atoms, desirably 1 to 10 carbon atoms, optionally having at least one substituent selected from an alkyl group having 1 to 10 carbon atoms, substituted or unsubstituted cycloalkyl group having 1 to 20 carbon atoms, desirably 1 to 10 carbon atoms, substituted or unsubstituted bicyclo or tricycloalkyl group having 1 to 20 carbon atoms, desirably 1 to 15 carbon atoms, an alkoxy group having 1 to 10 carbon atoms, an aryloxy group having 6 to 10 carbon atoms.

The alkenyl group on the (meth)acrylate desirably may be a substituted or unsubstituted alkenyl group having 2 to 20 carbon atoms, desirably 2 to 10 carbon atoms, optionally having at least one substituent selected from an alkyl group having 1 to 10 carbon atoms, an alkoxy group having 1 to 10 carbon atoms, an aryloxy group having 6 to 10 carbon atoms, an epoxy group having 2 to 10 carbon atoms, hydroxyl and the like.

The heterocyclo group on the (meth)acrylate desirably may be a substituted or unsubstituted heterocyclo group having 2 to 20 carbon atoms, desirably 2 to 10 carbon atoms, containing at least one hetero atom selected from N and O, and optionally having at least one substituent selected from an alkyl group having 1 to 10 carbon atoms, an alkoxy group having 1 to 10 carbon atoms, an aryloxy group having 6 to 10 carbon atoms, or an epoxy group having 2 to 10 carbon atoms.

The alkoxy polyether mono(meth)acrylates can be substituted with an alkoxy group having 1 to 10 carbons and the polyether can have 1 to 10 repeat units.

Some exemplary mono-functional (meth)acrylate reactive diluents include, but are not limited to, methyl (meth)acrylate, ethyl (meth)acrylate, butyl (meth)acrylate, tetrahydrofuryl (meth)acrylate, lauryl acrylate, isooctyl acrylate, isodecyl acrylate, 2-ethylhexyl acrylate, isobornyl (meth)acrylate, dicyclopentenyl (meth)acrylate, octadecyl acrylate, 2-hydroxyethyl (meth)acrylate, 2-hydroxypropyl (meth)acrylate, 2-hydroxybutyl (meth)acrylate, 2-(2-ethoxyethoxy)ethyl acrylate, 2-phenoxyethyl acrylate, dicyclopentadienyl (meth)acrylate, dicyclopentenyloxyethyl (meth)acrylate, morpholine (meth)acrylate, 2-methoxyethyl (meth)acrylate, 2(2-ethoxy)ethoxy ethyl acrylate and caprolactone acrylate.

Some exemplary (meth)acrylamides may be unsubstituted (meth)acrylamides, N-alkyl substituted (meth)acrylamides or N,N-dialkyl substituted (meth)acrylamides. In the N-alkyl substituted (meth)acrylamides, the alkyl substituent desirably has 1 to 8 carbon atoms, such as N-ethyl acrylamide, N-octyl acrylamide and the like. In the N,N-dialkyl substituted (meth)acrylamides, the alkyl substituent desirably has 1 to 4 carbon atoms, such as N,N-dimethyl acrylamide and N,N-diethyl acrylamide.

In preferred embodiments according to the invention, mono-functional (meth)acrylate reactive diluents are used. Isobornyl (meth)acrylate, more preferably isobornyl acrylate, is particularly preferred.

The reactive diluents are contained in the composition according to the invention preferably in an amount of up to 70 wt.-%, such as 1 to 70 wt.-% or 5 to 60% by weight, such as 10 to 50 wt.-%, for example about 20, about 25, about 30, about 35, about 40, about 45 or about 50 wt.-%, based on the total weight of the composition. If a mixture of different reactive diluents are used, the amounts refer to their total amount in the composition.

In particularly preferred embodiments according to the invention, isobornyl acrylate is contained in the composition in an amount of up to 70 wt.-%, such as 0.1 to 60 wt.-%, more preferably 5 to 60 wt.-%, or 0.5 to 55% by weight, more preferably 10 to 50 wt.-%, based on the total weight of the composition.

The curable composition according to the invention comprises at least one photoinitiator for promoting the cross-linking of the polymers having terminal groups of formula (I) such as (meth)acrylate terminal groups.

For curing the polymers via the terminal groups of formula (I), the polymers or polymer compositions are exposed to radiation, in particular UV radiation, said radiation activating the photoinitiator. Photoinitiators may be radical or cationic photoinitiators. Suitable compounds are well-known in the art and include, without limitation, benzoin ethers, such as benzoin methyl ether and benzoin isopropyl ether, substituted acetophenones, such as 2,2-diethoxyacetophenon (commercially available under the tradename Irgacure 651® from BASF SE), 2,2-dimethoxy-2-phenyl-1-phenylethanone, dimethoxyhydroxyacetophenone, substituted α-ketols, such as 2-methoxy-2-hydroxy-propiophenone, aromatic sulfonylchlorides, such as 2-naphthyl sulfonyl chloride, and photoaktive oximes, such as 1-phenyl-1,2-propandion-2-(O-ethoxycarbonyl)oxime. The mentioned and further suitable photoinitiators can comprise the following residues: benzophenone-, acetophenone-, benzile-, benzoin-, hydroxyalkylphenone-, phenylcyclohexylketone-, anthrachinon-, trimethylbenzoylphosphinoxide-, methylthiophenylmorpholinketone-, aminoketone-, azobenzoin-, thioxanthon-, hexarylbisimidazole-, triazin-, or Fluorenone, wherein each of these residues may additionally be substituted with one or more halogen atoms and/or one or more alkoxy groups and/or one or more amino or hydroxy groups. One specific example of a suitable compound is ethyl (2, 4, 6-trimethylbenzoyl)-phenyl-phosphinate.

The photoinitiators are contained in the composition according to the invention preferably in an amount of from 0.01 to 5.0 wt.-%, more preferably from 0.1 to 4.0 wt.-%, most preferably 0.5 to 3.0 wt.-%, based in each case on the total weight of the composition. If a mixture of different photoinitiators are used, the amounts refer to their total amount in the composition.

The curable composition according to the invention comprises at least one filler. The at least one filler, may, without limitation, be selected from chalk, powdered limestone, silica, such as precipitated and/or pyrogenic silica, zeolites, bentonites, magnesium carbonate, kieselguhr, alumina, clay, tallow, titanium oxide, iron oxide, zinc oxide, sand, quartz, flint, mica, powdered glass and other ground minerals. In preferred embodiments, the filler(s) are precipitated and/or pyrogenic silica. Furthermore, organic fillers can also be used, in particular carbon black, graphite, wood fibers, wood flour, sawdust, cellulose, cotton, pulp, wood chips, chopped straw, chaff, ground walnut shells and other short-cut fibers. Furthermore, short fibers such as glass fibers, glass filament, polyacrylonitrile, carbon fibers, Kevlar fibers or polyethylene fibers can also be added. Aluminum powder is also suitable as a filler. In addition, hollow spheres with a mineral shell or a plastic shell are suitable as fillers. These can be e.g. hollow glass spheres which are commercially available with the trade names Glass Bubbles®. Plastic-based hollow spheres are commercially available, e.g. with the names Expancel® or Dualite®. These are composed of inorganic or organic substances, each with a diameter of 1 mm or less, preferably of 500 μm or less.

The filler(s) are preferably used in a quantity of 0.01 to 60 wt. %, more preferably 0.1 to 50 wt. %, for example 1 to 45 wt. %, 10 to 45, 20 to 45, 25 to 45, 10 to 50 or 20 to 50 wt.-% based on the total weight of the composition according to the invention. An individual filler or a combination of several fillers can be used. If a mixture of different fillers is used, the amounts refer to their total amount in the composition.

In various embodiments, the filler comprises silica, preferably in an amount of 1 to 30, more preferably 1 to 20, even more preferably 3 to 15 wt.-%, relative to the total weight of the composition. The silica may be pyrogenic silica.

For example, a highly disperse silica with a BET surface area (DIN ISO 9277; DIN 66132) of 10 to 500 m$^2$/g is used as a filler. Preferably, coated silicas with a BET surface area of 100 to 400, more preferably 100 to 300, in particular 150 to 300 and most particularly preferably 160 to 300 m$^2$/g, are used. Suitable silicas are for example commercially available from Wacker under the tradename HDK®, including HDK® H18.

In various embodiments, the filler comprises chalk (calcium carbonate), optionally surface coated with fatty acids, preferably in an amount of 25 to 50, more preferably 30 to 45 wt.-%, relative to the total weight of the composition.

Cubic, non-cubic, amorphous and other modifications of calcium carbonate can be used as chalk. Preferably, the chalks used are surface treated or coated. As a coating agent, preferably fatty acids, fatty acid soaps and fatty acid esters are used, for example lauric acid, palmitic acid or stearic acid, sodium or potassium salts of such acids or their alkyl esters. In addition, however, other surface-active substances, such as sulfate esters of long-chain alcohols or alkylbenzenesulfonic acids or their sodium or potassium salts or coupling reagents based on silanes or titanates, are also suitable. The surface treatment of chalks is often associated with an improvement in processability and adhesive strength and also the weathering resistance of the compositions.

Depending on the desired property profile, precipitated or ground chalks or mixtures thereof can be used. Ground chalks can be produced, for example, from natural lime, limestone or marble by mechanical grinding, using either dry or wet methods. Depending on the grinding method, fractions having different average particle sizes can be obtained. Advantageous specific surface area values (BET) are between 1.5 m$^2$/g and 50 m$^2$/g.

In preferred embodiments, chalk and/or silica, for example both, are used as fillers. In such embodiments where both are used, silica is used in amounts of preferably 1 to 20, more preferably 3 to 15 wt.-% and chalk in amounts of preferably 25 to 50, more preferably 30 to 45 wt.-%, relative to the total weight of the composition, while not exceeding the upper limit of 60 wt. % fillers in total.

The curable composition according to the invention can additionally comprise at least one adhesion promoter. It is possible to use conventional adhesion promoters known to the person skilled in the art (tackifiers) individually or as a combination of several compounds. The addition of at least one adhesion promoter can further improve long-term mechanical properties, in particular improved shear resistance after several days of curing of the composition.

Examples of suitable adhesion promoters include organosilanes such as aminosilanes, epoxysilanes, oligomeric silane compounds and heterocyclic organosilanes.

The term "heterocyclic organosilane" or "heterocyclic silane" used herein refers to a heterocyclic compound having a cyclic structure, preferably 4- to 10-membered, more preferably 5- to 8-membered cyclic structure, which contains at least one Si atom and at least one further heteroatom, preferably selected from Si, N, P, S and/or O, in particular Si and/or N. The term "heterocyclic aminosilane" used herein refers to a heterocyclic compound having a cyclic structure, preferably 4- to 10-membered, more preferably 5- to 8-membered cyclic structure, which contains at least one Si atom, at least one N atom, and optionally at least one further heteroatom, preferably selected from Si, N, P, S and/or O, in particular Si and/or N.

In preferred embodiments according to the invention, the composition comprises at least one adhesion promoter selected from the silanes having the general formula (V)

wherein
- $R^{11}$ is an alkylene group, optionally interrupted by a heteroatom, preferably selected from Si, N, P, S and/or O, in particular Si and/or N, preferably $C_1$ to $C_{10}$ alkylene, more preferably $C_1$ to $C_6$ alkylene, most preferably $C_1$ or $C_3$ alkylene;
- each $R^{12}$ is independently selected from the group consisting of a covalent bond, hydrogen, halogen, amino, a substituted or unsubstituted alkyl, alkenyl, alkynyl, cycloaliphatic, aryl, heteroaryl, and heteroalicyclic group or a combination thereof,
- each $R^{13}$ is independently selected from the group consisting of a substituted or unsubstituted alkyl, alkenyl, alkynyl, or acyl group;
- B is a nitrogen-containing group selected from the general formula (1), (2), (3), (4), or (5)

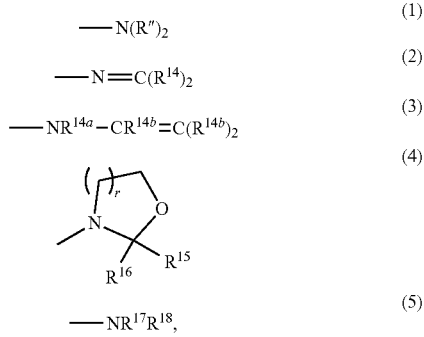

wherein
- each R" is independently selected from a covalent bond, hydrogen or a substituted or unsubstituted alkyl group;
- each $R^{14}$, $R^{14a}$, $R^{14b}$, $R^{14c}$, $R^{15}$ and $R^{16}$ is independently selected from the group consisting of hydrogen, a substituted or unsubstituted alkyl, alkenyl, alkynyl, cycloaliphatic, aryl, heteroaryl, and heteroalicyclic group or a combination thereof;
- r is 1, 2, 3 or 4;
- $R^{17}$ is $—Si(R^{19})_3$ and $R^{18}$ is selected from $—Si(R^{19})_3$, hydrogen, a substituted or unsubstituted alkyl, alkenyl, alkynyl, cycloaliphatic, aryl, heteroaryl, and heteroalicyclic group or a combination thereof, or
- $R^{17}$ and $R^{18}$ can combine to form together with the nitrogen atom to which they are attached a group of formula $—Si(R^{19})_2—R^{20}—Si(R^{19})_2—$,
    wherein each $R^{19}$ is independently selected from hydrogen, a substituted or unsubstituted alkyl, alkenyl, alkynyl, cycloaliphatic, or aryl group or a combination thereof, and $R^{20}$ is a linear or branched alkylene group, preferably $C_2$ or $C_3$ alkylene;
- or the N atom from the group B of the general formula (I) and the Si atom in the general formula (V) which $—(OR^{13})$ is attached to can combine to form a heterocyclic aminosilane structure, with one of the $R^{12}$ group(s) being a covalent bond and one of the R" groups being a covalent bond; and
- q is 0, 1, or 2.

In various embodiments, each R" in formula (1) is independently selected from hydrogen or a substituted or unsubstituted $C_1$-$C_8$ alkyl group, more preferably $C_1$-$C_6$ alkyl group. The alkyl group may be substituted, in particular with an amino or aminoalkyl group.

The adhesion promoters of general formula (V) with B being a group of the general formula (1) include, without limitation, aminosilanes selected from the group consisting of 3-aminopropyltrimethoxysilane, 3-aminopropyltriethoxysilane, aminomethyltrimethoxysilane, aminomethyltriethoxysilane, 3-aminopropylmethyldiethoxysilane, (N-2-aminoethyl)-3-aminopropyltrimethoxysilane, (N-2-aminoethyl)-3-aminopropyltriethoxysilane, diethylenetriaminopropyltrimethoxysilane, phenylaminomethyltrimethoxysilane, (N-2-aminoethyl)-3-aminopropylmethyldimethoxysilane, 3-(N-phenylamino)propyl-trimethoxysilane, 3-piperazinylpropylmethyldimethoxysilane, 3-(N,N-dimethylaminopropyl)aminopropylmethyldimethoxysilane, tri[(3-triethoxysilyl)propyl]amine, tri[(3-trimethoxysilyl)propyl]amine, and the oligomers thereof, 3-(N,N-dimethylamino)propyltrimethoxysilane, 3-(N,N-dimethylamino)-propyltriethoxysilane, (N,N-dimethylamino)methyltrimethoxysilane, (N,N-dimethylamino)methyltriethoxysilane, 3-(N,N-diethylamino)propyltrimethoxysilane, 3-(N,N-diethylamino)propyltriethoxysilane, (N,N-diethylamino)methyltrimethoxysilane, (N,N-diethylamino)methyltriethoxysilane, bis(3-trimethoxysilyl)propylamine, bis(3-triethoxysilyl)propylamin, and mixtures thereof, particularly preferably of 3-aminopropyltrimethoxysilane, 3-aminopropyltriethoxysilane, aminomethyltrimethoxysilane, aminomethyltriethoxysilane, 3-(N,N-dimethylamino)propyltrimethoxysilane, 3-(N,N-dimethylamino)propyltriethoxysilane, (N,N-dimethylamino)methyltrimethoxysilane, (N,N-dimethylamino)methyltriethoxysilane, 3-(N,N-diethylamino)propyltrimethoxysilane, 3-(N,N-diethylamino)propyltriethoxysilane, (N,N-diethylamino)methyltrimethoxysilane, (N,N-diethylamino)methyltriethoxysilane, bis(3-trimethoxysilyl)propylamine, bis(3-triethoxysilyl)propylamine, 4-amino-3,3-dimethylbuthyltrimethoxy silane, and 4-amino-3,3-dimethylbuthyltriethoxy silane. Suitable aminosilane adhesion promoters are for example commercially available under the tradename Geniosil® from Wacker, including Geniosil® GF91.

In certain embodiments, the adhesion promoter includes at least one heterocyclic aminosilane having the general formula (V) with B being a group of the general formula (1), wherein the N atom from the group B of the general formula (1) and the Si atom in the general formula (V) which $—(OR^{13})$ is attached to combine to form a heterocyclic aminosilane structure, with one of the $R^{12}$ group(s) being a covalent bond and one of the R" groups being a covalent bond. For example, heterocyclic organosilanes disclosed in EP 3613803 A1 can be used. In preferred embodiments,
- one of the R" groups in formula (1) is a covalent bond and the other R" group in formula (1) is selected from hydrogen or a substituted or unsubstituted $C_1$-$C_8$ alkyl group, more preferably from a $C_1$-$C_6$ alkyl group, in particular from methyl, ethyl, n-propyl, or n-butyl, most preferably is n-butyl; and/or
- the heterocyclic aminosilane has a 4- to 10-membered, more preferably 5- to 8-membered cyclic structure, most preferably cyclopentane or cyclooctane structure, which contains at least one Si atom, at least one N atom, and optionally at least one further heteroatom, preferably selected from Si, N, P, S and/or O, in particular Si and/or N; and/or each $R^{13}$ is independently selected from a substituted or unsubstituted alkyl, more preferably $C_1$-$C_6$ alkyl, most preferably methyl or ethyl, in particular methyl; and/or q is 1 and $R^{12}$ is a covalent bond.

This includes, without limitation, N-alkyl-aza-2,2-dialkoxysilacycloalkane, preferably N—$C_1$-$C_6$ alkyl-aza-2,2-dialkoxysilacycloalkane, wherein alkyl is preferably selected from methyl, ethyl, n-propyl, or n-butyl; alkoxy is preferably selected from methoxy or ethoxy; and cycloalkane is selected from cyclopentane or cyclooctane. In particular, N-n-butyl-aza-2,2-dimethoxysilacyclopentane is most preferred.

The adhesion promoters of general formula (V) with B being a group of the general formula (2), (3), (4), or (5) are herein referred to as a blocked or capped adhesion promoter. The terms "blocked" and "capped" in relation to the compound of general formula (V) are used interchangeably herein.

In various embodiments, in formula (2) one $R^{14}$ is hydrogen or methyl, preferably hydrogen, and the other $R^{14}$ is an unsubstituted alkyl group having 1 to 10 carbon atoms, preferably having 1 to 4 carbon atoms, such as, for example, isobutyl or methyl, or an unsubstituted aryl group, preferably phenyl.

In various embodiments, in formula (3) $R^{14a}$ and $R^{14b}$ and one $R^{14c}$ are hydrogen or methyl, preferably hydrogen, and the other $R^{14c}$ is an unsubstituted alkyl group having 1 to 10 carbon atoms, preferably having 1 to 4 carbon atoms, or an unsubstituted aryl group, preferably phenyl.

In various embodiments, $R^{15}$ and $R^{16}$ in formula (4) are hydrogen. In other embodiments, one is hydrogen and the other is alkyl, preferably $C_1$-$C_1$ alkyl, such as 3-heptyl or 2-propyl, aryl or alkylaryl with up to 15 carbon atoms, such as 2-(1-(4-tert-butyl-phenyl)propyl). In another embodiment, $R^{15}$ and $R^{16}$ in formula (4) are both not hydrogen and may preferably be selected from the afore-mentioned groups. In formula (4), r is preferably 1 or 2, more preferably 1.

In formula (5), $R^{17}$ is —Si($R^{19}$)$_3$ and each $R^{19}$ is preferably independently hydrogen, unsubstituted alkyl, more preferably $C_{1-4}$ alkyl, such as ethyl or methyl, or alkenyl, such as vinyl. $R^{18}$ is preferably hydrogen, alkyl, such as propylene or methylene, substituted with —Si($R^{19}$)$_3$, or —Si($R^{19}$)$_3$, preferably —Si($R^{19}$)$_3$, with each $R^{19}$ independently being unsubstituted alkyl, preferably methyl or ethyl, more preferably methyl, or, alternatively, alkenyl, such as vinyl. Generally, if one $R^{19}$ is hydrogen, the other $R^{19}$ groups are preferably not hydrogen. Preferred groups for $R^{17}$ include, but are not limited to, —SiH(CH$_3$)$_2$, —Si(CH$_3$)$_2$(CH=CH)$_2$, —Si(CH$_3$)$_2$(C$_6$H$_5$), and —Si(CH$_3$)$_3$. In such embodiments, q may be 0 or 1, $R^{11}$ may be propylene, and $R^{12}$, if present, may be methyl and $R^{13}$ may be methyl or ethyl, preferably ethyl.

In other preferred embodiments, $R^{17}$ and $R^{18}$ in formula (5) combine to form together with the nitrogen atom to which they are attached a group of formula —Si($R^{19}$)$_2$—$R^{20}$—Si($R^{19}$)$_2$—, wherein $R^{20}$ is a linear or branched alkylene group, preferably $C_2$ or $C_3$ alkylene, i.e., —Si($R^{19}$)$_2$—$C_{2-3}$ alkylene-Si($R^{19}$)$_2$—, in particular —Si($R^{19}$)$_2$—(CH$_2$)$_2$—Si($R^{19}$)$_2$—, with $R^{19}$ being unsubstituted alkyl, preferably methyl or ethyl, more preferably methyl, or, alternatively, vinyl.

In various embodiments, the capped adhesion promoter is a ketimine of formula (V) with q being 0, $R^{11}$ being methylene or propylene, preferably propylene, each $R^{13}$ being ethyl and B being a group of the general formula (2), wherein (i) one $R^{14}$ is methyl and the second $R^{14}$ is isobutyl or methyl; or (ii) one $R^{14}$ is hydrogen and the second $R^{14}$ is phenyl.

In various other embodiments, the capped adhesion promoter is a silane of formula (V) with q being 0, $R^{11}$ being methylene or propylene, preferably propylene, each $R^{13}$ being ethyl or methyl, preferably ethyl, and B being a group of formula (5), wherein $R^{17}$ is —Si($R^{19}$)$_3$ and $R^{18}$ is hydrogen, alkyl substituted with —Si($R^{19}$)$_3$, or —Si($R^{19}$)$_3$, preferably —Si($R^{19}$)$_3$, and each $R^{19}$ is independently alkyl, preferably methyl or ethyl, more preferably methyl. In various alternative embodiments, at least one $R^{19}$ can be alkylene, preferably vinyl.

The curable compositions according to the invention can comprise the adhesion promoter preferably in an amount of up to 5 wt.-%, more preferably from 0.1 to 2.5 wt.-%, in particular 0.3 to 1.5 wt.-%, based on the total weight of the composition. If a mixture of the adhesion promoters is used, the amounts refer to the total amount of such adhesion promoters in the composition.

The curable composition according to the invention may further comprise at least one curing catalyst for cross-linking the silane group. The at least one catalyst may thus serve as a curing catalyst (condensation catalyst) for the polymers having terminal groups of the general formula (11). The polymer having the terminal groups of the general formula (II) of the invention crosslinks in the presence of moisture and in so doing cure with the formation of Si—O—Si bonds. For curing the polymers via the terminal groups of formula (I), the polymers or polymer compositions are exposed to radiation, in particular UV radiation.

In various embodiments where a catalyst is used for the moisture curable groups, the curing catalyst may be a tin compound, preferably an organotin compound or an inorganic tin salt. Tin in these tin compounds is preferably bivalent or tetravalent. Suitable inorganic tin salts are, for example, tin(II) chloride and tin(IV) chloride. Organotin compounds (tin organyles) are used preferably as the tin compounds, however. Suitable organotin compounds are, for example, the 1,3-dicarbonyl compounds of bivalent or tetravalent tin, for example, the acetylacetonates such as di(n-butyl)tin(IV) di(acetylacetonate), di(n-octyl)tin(IV) di(acetylacetonate), (n-octyl)(n-butyl)tin(IV) di(acetylacetonate); the dialkyl tin(IV) dicarboxylates, for example, di-n-butyltin dilaurate, di-n-butyltin maleate, di-n-butyltin diacetate, di-n-octyltin dilaurate, di-n-octyltin diacetate, or the corresponding dialkoxylates, for example, di-n-butyltin dimethoxide; oxides of tetravalent tin, for example, dialkyltin oxides, such as, for example, di-n-butyltin oxide and di-n-octyltin oxide; and the tin(II) carboxylates such as tin(II) octoate or tin(II) phenolate.

Also suitable are tin compounds of ethyl silicate, dimethyl maleate, diethyl maleate, dioctyl maleate, dimethyl phthalate, diethyl phthalate, dioctyl phthalate, such as, for example, di(n-butyl)tin(IV) di(methyl maleate), di(n-butyl)tin(IV) di(butyl maleate), di(n-octyl)tin(IV) di(methyl maleate), di(n-octyl)tin(IV) di(butyl maleate), di(n-octyl)tin (IV) di(isooctyl maleate); and di(n-butyl)tin(IV) sulfide, (n-butyl)$_2$Sn(SCH$_2$COO), (n-octyl)$_2$Sn(SCH$_2$OOO), (n-octyl)$_2$Sn(SCH$_2$CH$_2$COO), (n-octyl)$_2$Sn(SCH$_2$CH$_2$OOOCH$_2$CH$_2$OCOCH$_2$S), (n-butyl)$_2$-Sn(SCH$_2$COO-i-C$_8$H$_{17}$)$_2$, (n-octyl)$_2$Sn(SCH$_2$OOO-i-C$_8$H$_{17}$)$_2$, and (n-octyl)$_2$Sn(SCH$_2$COO-n-C$_8$H$_{17}$)$_2$.

In some embodiments, the tin compound is selected from 1,3-dicarbonyl compounds of bivalent or tetravalent tin, the dialkyltin(IV) dicarboxylates, the dialkyltin(IV) dialkoxylates, the dialkyltin(IV) oxides, the tin(II) carboxylates, and mixtures thereof.

In various embodiments, the tin compound is a dialkyltin (IV) dicarboxylate, particularly di-n-butyltin dilaurate or di-n-octyltin dilaurate.

Additionally or alternatively, other metal-based condensation catalysts may be used, including, without limitation, compounds of titanium such as organotitanates or chelate complexes, cerium compounds, zirconium compounds, molybdenum compounds, manganese compounds, copper compounds, aluminum compounds, or zinc compounds or their salts, alkoxylates, chelate complexes, or catalytically active compounds of the main groups or salts of bismuth, lithium, strontium, or boron.

Further suitable (tin-free) curing catalysts are, for example, organometallic compounds of iron, particularly the 1,3-dicarbonyl compounds of iron such as, e.g., iron(III) acetylacetonate.

Boron halides such as boron trifluoride, boron trichloride, boron tribromide, boron triiodide, or mixtures of boron halides can also be used as curing catalysts. Particularly preferred are boron trifluoride complexes such as, e.g., boron trifluoride diethyl etherate, which as liquids are easier to handle than gaseous boron halides.

Further, amines, nitrogen heterocycles, and guanidine derivatives are suitable in general for catalysis. An especially suitable catalyst from this group is 1,8-diazabicyclo [5.4.0]undec-7-ene (DBU).

Titanium, aluminum, and zirconium compounds, or mixtures of one or more catalysts from one or more of the just mentioned groups may also be used as catalysts.

Suitable as titanium catalysts are compounds that have hydroxy groups and/or substituted or unsubstituted alkoxy groups, therefore titanium alkoxides of the general formula Ti(OR$^z$)$_4$, where R$^z$ is an organic group, preferably a substituted or unsubstituted hydrocarbon group having 1 to 20 C atoms, and the 4 alkoxy groups —OR$^z$ are identical or different. Further, one or more of the —OR$^z$ groups can be replaced by acyloxy groups —OCOR$^z$.

Likewise suitable as titanium catalysts are titanium alkoxides in which one or more alkoxy groups are replaced by a hydroxy group or halogen atoms.

Further, titanium chelate complexes can be used.

Aluminum catalysts can also be used as curing catalysts, e.g., aluminum alkoxides Al(OR$^z$)$_3$, where R$^z$ has the above meaning; i.e., it is an organic group, preferably a substituted or unsubstituted hydrocarbon group having 1 to 20 C atoms and the three R$^z$ groups are identical or different. In the case of aluminum alkoxides as well, one or more of the alkoxy groups can be replaced by acyloxy groups —OC(O)R$^z$.

Further, aluminum alkoxides can be used in which one or more alkoxy groups are replaced by a hydroxy group or halogen atoms.

Of the described aluminum catalysts, the pure aluminum alcoholates are preferred in regard to their stability to moisture and the curability of the mixtures to which they are added. In addition, aluminum chelate complexes are preferred.

Suitable as zirconium catalysts are, e.g.: tetramethoxyzirconium or tetraethoxyzirconium.

Diisopropoxyzirconium bis(ethyl acetoacetate), triisopropoxyzirconium (ethyl acetoacetate), and isopropoxyzirconium tris(ethyl acetoacetate) are used with very particular preference.

Further, zirconium acylates, halogenated zirconium catalysts, or zirconium chelate complexes can also be used.

In addition, carboxylic acid salts of metals or also a mixture of a number of such salts can be employed as curing catalysts, whereby these are selected from the carboxylates of the following metals: calcium, vanadium, iron, zinc, titanium, potassium, barium, manganese, nickel, cobalt, and/or zirconium.

Of the carboxylates, the calcium, vanadium, iron, zinc, titanium, potassium, barium, manganese, and zirconium carboxylates are preferred, because they exhibit a high activity. Calcium, vanadium, iron, zinc, titanium, and zirconium carboxylates are particularly preferred. Iron and titanium carboxylates are very particularly preferred.

The compositions contain the curing catalyst preferably in an amount of up to 5.0 wt.-%, preferably 0.01 to 3.0 wt.-%, more preferably 0.1 to 2.5 wt.-%, based in each case on the total weight of the composition. If a mixture of different catalysts is used, the amounts refer to the total amount in the composition.

The curable composition according to the invention can further comprise as an additional component at least one compound of the general formula (VI) and/or (VII)

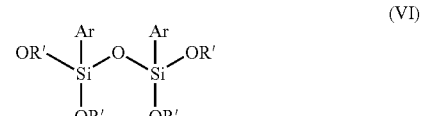

(VI)

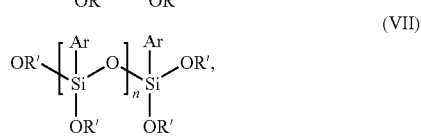

(VII)

wherein R' is independently selected from the group consisting of a hydrogen atom and hydrocarbon residues having 1 to 12 carbon atoms; Ar is selected from aryl groups; and n is an integer selected from 2 to 10. In preferred embodiments, the aryl group is a phenyl group and/or R' is selected from a methyl or ethyl group, more preferably a methyl group and/or n is an integer selected from 2 to 4, more preferably 2 to 3, most preferably 3. The most preferred compound of the general formula (VI) is diphenyltetramethoxydisiloxane.

It has been shown that, when using the at least one compound of the general formula (VI) or (VII) above, the compositions according to the invention have an improved tensile strength and elongation.

The proportion of compound of the general formula (VI) and/or (VII) in the curable composition according to the invention is preferably 0.1 to 30 wt. %, more preferably 2 to 20 wt. %, even more preferably 3 to 15 wt. % based on the total weight of the composition.

The composition according to the invention may comprise one or more auxiliary substance, which can contribute to the expression of desired properties, in an amount of up to 70 wt.-%, preferably 0.01 to 60 wt.-%, based on the total weight of the composition. The auxiliary substances may include, without limitation, plasticizers, light/UV stabilizers, drying agents, water scavengers, pigments or pigment pastes, fungicides, flame retardants and/or solvents.

In various embodiments, light/UV stabilizers, drying agents, water scavengers, pigments or pigment pastes, fungicides and/or solvents can be contained in the curable composition in an amount of up to 10 wt.-%, preferably from 0.01 to 5 wt.-%, based on the total weight of the composition.

In various embodiments, plasticizers and/or flame retardants can be contained in the curable composition in an amount of up to 70 wt.-%, preferably from 1 to 60 wt.-%, based on the total weight of the composition.

In particular, the so-called hindered amine light stabilizers (HALS) are suitable as light/UV stabilizers. For example, a UV stabilizer can be used which carries a silyl group and is incorporated into the end product during crosslinking or curing. Furthermore, benzotriazoles, benzophenones, benzoates, cyanoacrylates, acrylates, sterically hindered phenols, phosphorus and/or sulfur can also be added. The curable composition according to the invention preferably comprises at least one bis(piperidyl) dicarboxylic acid diester, for example bis(2,2,6,6-tetramethyl-4-piperidyl) sebacate, or a benzotriazol, for example 2-(2H-Benzotriazol-2-yl)-4,6-di-tert-pentylphenol. Such light stabilizers are available under the tradename Tinuvin® from BASF SE. They are typically used in amounts of 0.01 to 5 wt.-%, preferably 0.1 to 3 wt.-%, based on the total weight of the composition.

The curable composition according to the invention preferably comprises the following components in the stated proportions by weight:
at least one polymer A and at least one optional polymer B 15-90 wt. %, preferably 20-70 wt. %,
at least one reactive diluent 1-70 wt. %, preferably 5-60 wt. %,
at least one photoinitiator 0.01-5 wt. %, preferably 0.1-4 wt. %,
at least one filler 0.01-60 wt. %, preferably 0.1-50 wt. %,
optionally, at least one adhesion promoter 0-5 wt. %, preferably 0.1-2.5 wt. %,
optionally, at least one curing catalyst 0-5 wt. %, preferably 0.01-3 wt. %,
optionally, one or more auxiliary substance(s) 0-70 wt. %, preferably 0.01-60 wt. %,
wherein the proportions by weight add up to 100 wt. % and the proportions by weight are based on the total weight of the curable composition.

With regard to the preferred representatives of the individual components and the preferably used quantities thereof, the statements made above in the description of the respective components apply.

The production of the composition according to the invention takes place by known methods by intimate mixing of the components in suitable dispersing apparatus, for example a high-speed mixer. Alternatively or additionally, the composition may be compounded. Compounding may be achieved in a reactor or preferably by extrusion. For example, the compounding may be achieved by extrusion using a twin screw with a multifeeder system.

The present invention also relates to the use of the curable composition according to the invention herein as adhesive, sealant, and/or coating materials.

The present invention also provides adhesive, sealant, or coating materials comprising the curable composition according to the invention.

In dual curing system, curing is typically a two-step procedure, where the first curing step includes exposure to radiation, in particular UV radiation. This leads to crosslinking of the (meth)acrylate groups, i.e. the terminal groups of formula (I). In a second curing step, the curing is typically achieved by exposure to (atmospheric) moisture. This leads to the crosslinking of the silane groups, i.e. the terminal groups of formula (II).

In principle, in the present invention, all features mentioned in the context of the present text, in particular the embodiments, ranges of proportions, components and other features of the composition according to the invention and of the uses according to the invention shown as preferred and/or special can be implemented in all possible and not mutually exclusive combinations, with combinations of features shown as preferred and/or special also being regarded as preferred and/or special. All embodiments disclosed for the compositions per se can similarly be applied to the uses and methods described herein and vice versa.

EXAMPLES

Example 1: Radiation Curable Compositions

Preparation of Polymer 1

In a first step, 94.5 wt.-% of polypropylene oxide (PPG 12000), 3.5 wt.-% of isophorone diisocyanate (IPDI) and 0.2 wt.-% of dioctyl tin dilaurate (DOTL) were mixed for 0.5 hours at 80° C. under nitrogen at 400 U/minute. The molar ratio of OH groups to NCO groups was 1:2. After the reaction, the reaction mixture was allowed to cool to 25° C. and then 1.9 wt.-% of hydroxy ethyl methacrylate (HEMA) was added (in an amount that corresponds to a molar ratio of OH(from polyol):NCO:OH(from HEMA) of 1:2:0.95). Mixing was carried out for 24 hours at 25° C. Methacrylate-terminated polymer (Polymer 1 with $M_w$ of 55,000 g/mol determined by gel permeation chromatography (GPC) with tetrahydrofuran (THF) as the eluent according to DIN 55672-1:2007-08 and a viscosity of 145,000 mPas (Anton Paar, Physica MCR 301 at 23° C., Spindle PP25) was obtained.

Preparation of Formulations 1-A to 1-D (1-A to 1-D)

The obtained Polymer 1 was used in various formulations. All amounts given are in wt.-% relative to the total weight of the composition. All formulations were tack-free after curing with UV light. Mechanical properties of the UV curable formulations were measured and the results are shown in Table 1 below.

TABLE 1

| (all amounts in wt.-%) | | | | |
|---|---|---|---|---|
| | 1-A | 1-B | 1-C | 1-D |
| Polymer 1 | 54.3 | 51.6 | 40.73 | 27.15 |
| Tinuvin 328 | 0.44 | 0.44 | 0.44 | 0.44 |
| Viscoexcel 30 SG (fatty acid modified chalk filler) | 39.8 | 39.8 | 39.8 | 39.8 |
| HDK H18 (fumed silica) | 4.5 | 4.5 | 4.5 | 4.5 |
| Isobornyl acrylate | 0 | 2.7 | 13.57 | 27.15 |
| Omnirad TPO-L | 0.96 | 0.96 | 0.96 | 0.96 |
| Total | 100 | 100 | 100 | 100 |
| Tear strength [N/mm] | 13.8 | 14.5 | 18.4 | 29.8 |
| Tensile strength [N/mm$^2$] | 4.8 | 6 | 7.7 | 8.6 |
| Elongation at break [%] | 530 | 585 | 676 | 380 |

Example 2: Radiation and Moisture Dual Curable Compositions

Preparation of Polymer 2

In a first step, 72.8 wt.-% of polypropylene oxide (PPG 2000), 16.2 wt.-% of isophorone diisocyanate (IPDI) and 0.07 wt.-% of dioctyl tin dilaurate (DOTL) were mixed for 0.5 hours at 80° C. under nitrogen at 400 U/minute. The molar ratio of OH groups to NCO groups was 1:2. After the reaction, the reaction mixture was allowed to cool to 25° C. and then 6.5 wt.-% of aminopropyl trimethoxysilane (AMMO) was added, and 0.5 hours later 4.5 wt.-% of hydroxy ethyl methacrylate (HEMA) was added (in an amount that corresponds to a molar ratio of OH(from polyol):NCO:NH$_2$(from AMMO):OH(acrylate from HEMA) of 1:2:0.5:0.48). Mixing was carried out for 4.5 hours at 25° C. The mixture of methacrylate-terminated polymer, silane-terminated polymer, and methacrylate- and silane-terminated polymer (Polymer 2 with M$_w$ of 7400 g/mol determined by gel permeation chromatography (GPC) with tetrahydrofuran (THF) as the eluent according to DIN 55672-1:2007-08 and a viscosity of 68,000 mPas (Anton Paar, Physica MCR 301 at 23° C., Spindle PP25) was obtained.

Preparation of Formulations 2-A to 2-E (2-A to 2-E)

In addition to Formulation 1-C prepared in Example 1, the obtained Polymer 2, at least one adhesion promoter, and a curing catalyst were added in various formulations. All formulations were tack-free after curing with UV light. Mechanical properties of the UV and moisture dual curable formulations were measured and the results are shown in Table 2 below.

TABLE 2

(all amounts in parts by weight)

|  | 2-A | 2-B | 2-C | 2-D | 2-E |
|---|---|---|---|---|---|
| Formulation 1-C | 95 | 95 | 95 | 95 | 95 |
| Polymer 2 | 5 | 5 | 5 | 5 | 5 |
| N-n-butyl-aza-2,2-dimethoxysilacyclopentane | 0 | 1 | 0 | 1 | 0 |
| Aminopropyltrimethoxysilane | 0 | 0 | 1 | 0 | 1 |
| dioctyl tin dilaurate (DOTL) | 0 | 0 | 0 | 0.2 | 0.2 |
| Tear strength [N/mm] | 18 | 9.1 | 9.7 | 9.3 | 10.3 |
| Tensile strength [N/mm$^2$] | 8.3 | 6.1 | 6.2 | 6.4 | 6.4 |
| Elongation at break [%] | 704 | 594 | 510 | 551 |  |
| Shear resistance [N/mm$^2$] directly after curing (% ratio compared to the shear resistance of 2-A) | | | | | |
| PMMA-Stainless steel | 0.9 | 0.6 (67%) | 0.7 (78%) | 0.7 (78%) | 0.9 (100%) |
| PMMA-Aluminium | 1.1 | 0.8 (73%) | 0.8 (73%) | 1.1 (100%) | 1.1 (100%) |
| PMMA-Glass | 0.9 | 0.6 (67%) | 0.6 (67%) | 0.9 (100%) | 1.1 (122%) |
| PMMA-PC | 0.9 | 0.9 (100%) | 0.7 (78%) | 1.3 (144%) | 1.4 (156%) |
| PMMA-PVC | 1.0 | 0.7 (70%) | 0.9 (90%) | 1.1 (110%) | 1.2 (120%) |
| PMMA-PMMA | 1.1 | 1.0 (91%) | 1.3 (118%) | 1.2 (109%) | 1.4 (127%) |
| Shear resistance [N/mm$^2$] 7 d after curing (% ratio compared to the shear resistance of 2-A) | | | | | |
| PMMA-Stainless steel | 1.1 | 1.2 (109%) | 2.6 (236%) | 1.1 (100%) | 1.2 (109%) |
| PMMA-Aluminium | 1.1 | 1.5 (136%) | 2.7 (245%) | 1.3 (118%) | 1.8 (164%) |
| PMMA-Glass | 0.8 | 2.2 (275%) | 2.4 (300%) | 1.6 (200%) | 1.9 (238%) |
| PMMA-PC | 1.1 | 1.9 (173%) | 2.1 (191%) | 1.5 (136%) | 2.2 (200%) |
| PMMA-PVC | 1.4 | 1.5 (107%) | 2.1 (150%) | 1.6 (114%) | 1.8 (129%) |
| PMMA-PMMA | 1.4 | 3.4 (243%) | 2.7 (193%) | 2.4 (171%) | 2.4 (171%) |

PMMA: poly(methylmethacrylate) substrate
PC: polycarbonate substrate
PVC: polyvinyl chloride substrate Measurement Methods Tear strength was determined in accordance with DIN ISO 34-1 2004-07. The samples were cure in a mold with 1 side open in a UV Curing chamber with 100% intensity for 1 min first, and then the samples were turned around and cured for 1 min on the other side.

Tensile strength and elongation at break were determined in accordance with DIN 53504. The samples were cure in a mold with 1 side open in a UV Curing chamber with 100% intensity for 1 min first, and then the samples were turned around and cured for 1 min on the other side. The specimen type S3 (Dog bone) was used and the speed of the pull head in the dynamometer was 500 mm/min.

Shear resistance was determined in accordance with DIN EN 1465. The samples were exposed to UV radiation for 1 min through the PMMA side which is transparent.

The invention claimed is:

1. A curable composition, comprising
   a) at least one first polymer A comprising at least one terminal group of the general formula (1)

$$-A^1-C(=O)-CR^1=CH_2 \tag{1}$$

wherein
   $A^1$ is a divalent bonding group containing at least one heteroatom; and
   $R^1$ is selected from hydrogen and $C_1$ to $C_4$ alkyl; and,
   optionally, at least one terminal group of the general formula (II)

$$-A^2-SiXYZ \tag{II}$$

wherein
   $A^2$ is a divalent bonding group containing at least one heteroatom; and
   X, Y, Z are each, independently of one another, selected from the group consisting of a hydroxyl group, $C_1$ to $C_8$ alkyl group, $C_1$ to $C_8$ alkoxy group, and $C_1$ to $C_8$ acyloxy group, wherein X, Y, Z are substituents directly bound with the Si atom or the two of the substituents X, Y, Z form a ring together with the Si atom to which they are bound, and at least one of the substituents X, Y, Z is selected from the group consisting of a hydroxyl group, $C_1$ to $C_8$ alkoxy group and $C_1$ to $C_8$ acyloxy group, b) at least one second polymer B comprising at least one terminal group of the general formula (II)

$$-A^2-SiXYZ \tag{II}$$

wherein

A² is a divalent bonding group containing at least one heteroatom; and

X, Y, Z are each, independently of one another, selected from the group consisting of a hydroxyl group, $C_1$ to $C_8$ alkyl group, $C_1$ to $C_8$ alkoxy group, and $C_1$ to $C_8$ acyloxy group, wherein X, Y, Z are substituents directly bound with the Si atom or the two of the substituents X, Y, Z form a ring together with the Si atom to which they are bound, and at least one of the substituents X, Y, Z is selected from the group consisting of a hydroxyl group, $C_1$ to $C_8$ alkoxy and $C_1$ to $C_8$ acyloxy group, c) at least one reactive diluent,
d) at least one photoinitiator,
e) at least one filler,
f) optionally, at least one adhesion promoter, and
g) optionally, at least one curing catalyst.

2. The curable composition according to claim 1, wherein the polymer backbone of the at least one first polymer A and the at least one second polymer B are independently selected from the group consisting of polyoxyalkylene, poly(meth) acrylate, polyester, and combinations thereof.

3. The curable composition according to claim 1, wherein the polymer backbone of the at least one first polymer A and the at least one second polymer B are polyoxyalkylene.

4. The curable composition according to claim 1, wherein $A^1$ and/or $A^2$ comprises a substituted or unsubstituted ether, amide, carbamate, urethane, urea, imino, siloxane, carboxylate, carbamoyl, amidino, carbonate, sulfonate or sulfinate group.

5. The curable composition according to claim 1, wherein $A^1$ and/or $A^2$ comprise a urea and/or urethane group.

6. The curable composition according to claim 1, wherein in formula (II), X, Y, and Z are, independently of one another, selected from a hydroxyl, a methyl, an ethyl, a methoxy, or an ethoxy group, wherein at least one of the substituents is a hydroxyl group, or a methoxy or an ethoxy group.

7. The curable composition according to claim 1, wherein in formula (II), X, Y, and Z are, independently of one another, selected from a methoxy group or an ethoxy group.

8. The curable composition according to claim 1, wherein the total proportion of the terminal groups of the general formula (I) is 50 to 100 mol-%, and the total proportion of the terminal groups of the general formula (II) is 50 to 0 mol-%, wherein the proportion relates to the total amounts of the terminal groups of the general formulae (I) and (II) of the polymer A and the polymer B in the composition.

9. The curable composition according to claim 1, wherein the molar ratio of terminal groups of formula (I) to terminal groups of formula (II) is at least 2:1.

10. The curable composition according to claim 1, wherein said at least one polymer A comprises at least one terminal group of the general formula (II).

11. The curable composition according to claim 1, wherein the reactive diluent is selected from the group consisting of mono-functional (meth)acrylates, (meth)acrylamides, (meth)acrylic acid and combinations thereof.

12. The curable composition according to claim 1, wherein the reactive diluent is a monofunctional (meth) acrylate.

13. The curable composition according to claim 1, wherein the adhesion promoter is selected from silanes having the general formula (V)

$$B-R^{11}-SiR^{12}_q(OR^{13})_{3-q} \qquad (V),$$

wherein $R^{11}$ is an alkylene group, optionally interrupted by a heteroatom;

each $R^{12}$ is independently selected from the group consisting of a covalent bond, hydrogen, halogen, amino, a substituted or unsubstituted alkyl, alkenyl, alkynyl, cycloaliphatic, aryl, heteroaryl, and heteroalicyclic group or a combination thereof, each $R^{13}$ is independently selected from the group consisting of a substituted or unsubstituted alkyl, alkenyl, alkynyl, or acyl group;

B is a nitrogen-containing group selected from the general formula (1), (2), (3),

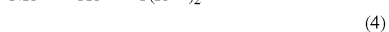

wherein each R" is independently selected from a covalent bond, hydrogen or a substituted or unsubstituted alkyl group;

each $R^{14}$, $R^{14a}$, $R^{14b}$, $R^{14c}$, $R^{15}$ and $R^{16}$ is independently selected from the group consisting of hydrogen, a substituted or unsubstituted alkyl, alkenyl, alkynyl, cycloaliphatic, aryl, heteroaryl, and heteroalicyclic group or a combination thereof;

r is 1, 2, 3 or 4;

$R^{17}$ is $-Si(R^{19})_3$ and $R^{18}$ is selected from $-Si(R^{19})_3$, hydrogen, a substituted or unsubstituted alkyl, alkenyl, alkynyl, cycloaliphatic, aryl, heteroaryl, and heteroalicyclic group or a combination thereof, or $R^{17}$ and $R^{18}$ can combine to form together with the nitrogen atom to which they are attached a group of formula $-Si(R^{19})_2-R^{20}-Si(R^{19})_2-$, wherein each $R^{19}$ is independently selected from hydrogen, a substituted or unsubstituted alkyl, alkenyl, alkynyl, cycloaliphatic, or aryl group or a combination thereof, and $R^{20}$ is a linear or branched alkylene group;

or the N atom from the group B of the general formula (1) and the Si atom in the general formula (V) which $-(OR^{13})$ is attached to can combine to form a heterocyclic aminosilane structure, with one of the $R^{12}$ group(s) being a covalent bond and one of the R" groups being a covalent bond; and q is 0, 1, or 2.

14. The curable composition according to claim 1, wherein the adhesion promoter comprises at least one aminosilane selected from the group consisting of 3-aminopropyltrimethoxysilane, 3-aminopropyltriethoxysilane, aminomethyltrimethoxysilane, aminomethyltriethoxysilane, 3-aminopropylmethyldiethoxysilane, (N-2-aminoethyl)-3-aminopropyltrimethoxysilane, (N-2-aminoethyl)-3-aminopropyltriethoxysilane, diethylenetriaminopropyltrimethoxysilane, phenylaminomethyltrimethoxysilane, (N-2-aminoethyl)-3-aminopropylmethyldimethoxysilane, 3-(N-phenylamino)propyl-trimethoxysilane, 3-piperazinylpropylmethyldimethoxysilane, 3-(N,N-dimethylaminopropyl)aminopropylmethyldimethoxysilane, tri[(3-triethoxysilyl)propyl]amine, tri[(3-trimethoxysilyl)propyl]amine, and the oligomers thereof, 3-(N,N-dimethylamino)propyltrimethoxysilane, 3-(N,N-dimethylamino)-propyltriethoxysilane, (N,N-dimethylamino)methyltrimethoxysilane, (N,N-dimethylamino)methyltriethoxysilane, 3-(N,N-diethylamino)propyltrimethoxysilane, 3-(N,N-diethylamino)propyltriethoxysilane, (N,N-diethylamino)methyltrimethoxysilane, (N,N-diethylamino)methyltriethoxysilane, bis(3-trimethoxysilyl)propylamine, bis(3-triethoxysilyl)propylamin, and mixtures thereof.

15. The curable composition according to claim 1, wherein the adhesion promoter comprises at least one aminosilane selected from the group consisting of 3-aminopropyltrimethoxysilane, 3-aminopropyltriethoxysilane, aminomethyltrimethoxysilane, aminomethyltriethoxysilane, 3-(N,N-dimethylamino)propyltrimethoxysilane, 3-(N,N-dimethylamino)propyltriethoxysilane, (N,N-dimethylamino)methyltrimethoxysilane, (N,N-dimethylamino)methyltriethoxysilane, 3-(N,N-diethylamino)propyltrimethoxysilane, 3-(N,N-diethylamino)propyltriethoxysilane, (N,N-diethylamino)methyltrimethoxysilane, (N,N-diethylamino)methyltriethoxysilane, bis(3-trimethoxysilyl)propylamine, bis(3-triethoxysilyl)propylamine, 4-amino-3,3-dimethylbuthyltrimethoxy silane, and 4-amino-3,3-dimethylbuthyltriethoxy silane.

16. The curable composition according to claim 1, wherein the adhesion promoter comprises at least one heterocyclic aminosilane having the general formula (V) with B being a group of the general formula (1), wherein the N atom from the group B of the general formula (1) and the Si atom in the general formula (V) which —(OR$^{13}$) is attached to combine to form a heterocyclic aminosilane structure, with one of the R$^{12}$ group(s) being a covalent bond and one of the R" groups being a covalent bond.

17. The curable composition according to claim 1, wherein the adhesion promoter comprises N-alkyl-aza-2,2-dialkoxysilacycloalkanes, wherein alkyl is selected from methyl, ethyl, n-propyl, or n-butyl; alkoxy is selected from methoxy or ethoxy; and cycloalkane is selected from cyclopentane or cyclooctane.

18. The curable composition according to claim 1, wherein the composition further comprises one or more auxiliary substances, selected from plasticizer, light/UV stabilizer, drying agent, water scavenger, pigment, pigment paste, fungicide, flame retardant and/or solvent.

19. The curable composition according to claim 1, wherein the composition comprises, relative to the total weight of the composition, at least one polymer A and at least one polymer B 15-90 wt. %;
at least one reactive diluent 1-70 wt. %;
at least one photoinitiator 0.01-5 wt. %;
at least one filler 0.01-60 wt. %;
optionally, at least one adhesion promoter 0-5 wt. %;
optionally, at least one curing catalyst 0-5 wt. %; and
optionally, one or more auxiliary substance(s) 0-70 wt. %;
wherein the proportions by weight add up to 100 wt. % and the proportions by weight are based on the total weight of the curable composition.

20. An adhesive, sealant and/or coating material comprising a curable composition according to claim 1.

21. A curable composition, comprising a) at least one first polymer A comprising at least one terminal group of the general formula (1)

$$-A^1-C(=O)-CR^1=CH_2 \quad (1),$$

wherein
A$^1$ is a divalent bonding group containing at least one heteroatom; and
R$^1$ is selected from hydrogen and C$_1$ to C$_4$ alkyl; and,
optionally, at least one terminal group of the general formula (II)

$$-A^2-SiXYZ \quad (II),$$

wherein
A$^2$ is a divalent bonding group containing at least one heteroatom; and
X, Y, Z are each, independently of one another, selected from the group consisting of a hydroxyl group, C$_1$ to C$_8$ alkyl group, C$_1$ to C$_8$ alkoxy group, and C$_1$ to C$_8$ acyloxy group, wherein X, Y, Z are substituents directly bound with the Si atom or the two of the substituents X, Y, Z form a ring together with the Si atom to which they are bound, and at least one of the substituents X, Y, Z is selected from the group consisting of a hydroxyl group, C$_1$ to C$_8$ alkoxy group and C$_1$ to C$_8$ acyloxy group,
b) optionally, at least one second polymer B comprising at least one terminal group of the general formula (II)

$$-A^2-SiXYZ \quad (II),$$

wherein
A$^2$ is a divalent bonding group containing at least one heteroatom; and
X, Y, Z are each, independently of one another, selected from the group consisting of a hydroxyl group, C$_1$ to C$_8$ alkyl group, C$_1$ to C$_8$ alkoxy group, and C$_1$ to C$_8$ acyloxy group, wherein X, Y, Z are substituents directly bound with the Si atom or the two of the substituents X, Y, Z form a ring together with the Si atom to which they are bound, and at least one of the substituents X, Y, Z is selected from the group consisting of a hydroxyl group, C$_1$ to C$_8$ alkoxy and C$_1$ to C$_8$ acyloxy group,
c) at least one reactive diluent,
d) at least one photoinitiator,
e) at least one filler,
f) optionally, at least one adhesion promoter, and
g) optionally, at least one curing catalyst,
wherein the curable composition comprises, relative to the total weight of the curable composition, the at least one filler in an amount between 20 to 50 wt. %.

22. The curable composition according to claim 21, wherein the composition comprises, relative to the total weight of the composition, the at least one filler in an amount between 25 to 45 wt. %.

23. The curable composition according to claim 21, wherein the at least one filler comprises chalk, powdered limestone, silica, zeolites, bentonites, magnesium carbonate, kieselguhr, alumina, clay, tallow, titanium oxide, iron oxide, zinc oxide, sand, quartz, flint, mica, powdered glass, aluminum powder, and/or mixtures thereof.

24. The curable composition according to claim 21, wherein the at least one filler comprises carbon black, graphite, wood fibers, wood flour, sawdust, cellulose, cotton, pulp, wood chips, chopped straw, chaff, ground walnut shells, and/or mixtures thereof.

25. The curable composition according to claim 21, wherein the at least one filler comprises glass fibers, glass filament, polyacrylonitrile, carbon fibers, Kevlar fibers, polyethylene fibers, and/or mixtures thereof.

26. The curable composition according to claim 21, wherein the at least one filler comprises hollow spheres with a mineral shell or a plastic shell.

27. The curable composition according to claim 21, wherein the at least one filler comprises pyrogenic silica.

28. The curable composition according to claim 21, wherein the at least one filler comprises fatty acid modified chalk.

* * * * *